United States Patent
Papernik et al.

(10) Patent No.: US 11,593,351 B2
(45) Date of Patent: Feb. 28, 2023

(54) ERROR CORRECTION FOR DATA CONTROL LEDGERS

(71) Applicant: Bank of America Corporation, Charlotte, NC (US)

(72) Inventors: Christopher Papernik, New York, NY (US); John H. Kling, Alexandria, VA (US); Nathaniel B. Clark, Wheaton, IL (US); Brian Russell Iverson, Buda, TX (US); Charles Dudley, Charlotte, NC (US); Paul Joseph Harding, Langdon Hills (GB)

(73) Assignee: Bank of America Corporation, Charlotte, NC (US)

( * ) Notice: Subject to any disclaimer, the term of this patent is extended or adjusted under 35 U.S.C. 154(b) by 165 days.

(21) Appl. No.: 17/028,933

(22) Filed: Sep. 22, 2020

(65) Prior Publication Data

US 2022/0092053 A1 Mar. 24, 2022

(51) Int. Cl.
*G06F 16/23* (2019.01)

(52) U.S. Cl.
CPC ...... *G06F 16/2365* (2019.01); *G06F 16/2379* (2019.01)

(58) Field of Classification Search
CPC .................. G06F 16/2365; G06F 16/2379
See application file for complete search history.

(56) References Cited

U.S. PATENT DOCUMENTS

| | | | |
|---|---|---|---|
| 7,010,691 B2 | 3/2006 | Wheeler et al. |
| 7,073,055 B1 | 7/2006 | Freed et al. |
| 7,143,284 B2 | 11/2006 | Wheeler et al. |
| 9,218,475 B2 | 12/2015 | Everhart et al. |
| 9,864,987 B2 | 1/2018 | McCarthy et al. |
| 9,965,645 B2 | 5/2018 | Sinor |
| 9,967,261 B2 | 5/2018 | Liebl, III et al. |

(Continued)

FOREIGN PATENT DOCUMENTS

| CA | 3015697 A1 * | 9/2017 | ......... H04L 63/0428 |
|---|---|---|---|
| EP | 3376452 A1 | 9/2018 | |

(Continued)

OTHER PUBLICATIONS

Gareth William Peters, Efstathios Panayi; "Understanding Modern Banking Ledgers through Blockchain Technologies: Future of Transaction Processing and Smart Contracts on the Internet of Money"; Nov. 18, 2015; arXiv:1511.05740v1 (Year: 2015).*

(Continued)

*Primary Examiner* — Dennis Truong

(57) ABSTRACT

A device configured to receive a first current status for a user account from a provisioning service device. The device is further configured to query a status log using to determine a second current status of the user account. The device is further configured to compare the first current status for the user account from the provisioning service device to the second current status of the user account in the status log, to determine the first current status for the user account does not match the second current status of the user account, and to update one of the status log and the provisioning service device in response to determining that the first current status for the user account does not match the second current status of the user account.

20 Claims, 18 Drawing Sheets

(56) References Cited

U.S. PATENT DOCUMENTS

| | | | |
|---|---|---|---|
| 10,282,558 B2 | 5/2019 | Chan et al. | |
| 10,361,869 B2 | 7/2019 | Gorman | |
| 10,474,834 B1 | 11/2019 | Frensch et al. | |
| 10,484,178 B2 | 11/2019 | Andrade | |
| 10,505,720 B2 | 12/2019 | Li | |
| 10,505,737 B1 | 12/2019 | Xu et al. | |
| 10,558,974 B2 | 2/2020 | Smith et al. | |
| 10,630,463 B2 | 4/2020 | Mankovskii et al. | |
| 10,678,944 B2 | 6/2020 | Khi et al. | |
| 2005/0102226 A1* | 5/2005 | Oppenheimer | G06Q 40/02 705/38 |
| 2005/0204041 A1 | 9/2005 | Blinn et al. | |
| 2016/0292672 A1 | 10/2016 | Fay et al. | |
| 2016/0330027 A1 | 11/2016 | Ebrahimi | |
| 2017/0103391 A1* | 4/2017 | Wilson, Jr. | H04L 9/30 |
| 2017/0124556 A1 | 5/2017 | Seger, II | |
| 2017/0132615 A1 | 5/2017 | Castinado et al. | |
| 2017/0236104 A1 | 8/2017 | Biton | |
| 2017/0243209 A1* | 8/2017 | Johnsrud | H04M 15/854 |
| 2017/0243286 A1* | 8/2017 | Castinado | H04L 9/3239 |
| 2017/0287068 A1 | 10/2017 | Nugent | |
| 2017/0300627 A1 | 10/2017 | Giordano et al. | |
| 2017/0301047 A1 | 10/2017 | Brown et al. | |
| 2017/0316390 A1 | 11/2017 | Smith et al. | |
| 2017/0330159 A1 | 11/2017 | Castinado et al. | |
| 2018/0060496 A1 | 3/2018 | Bulleit et al. | |
| 2018/0075686 A1 | 3/2018 | Campero et al. | |
| 2018/0101842 A1* | 4/2018 | Ventura | H04L 9/0841 |
| 2018/0113752 A1 | 4/2018 | Derbakova et al. | |
| 2018/0130034 A1 | 5/2018 | Taylor et al. | |
| 2018/0144156 A1 | 5/2018 | Marin | |
| 2018/0204191 A1 | 7/2018 | Wilson et al. | |
| 2018/0285879 A1 | 10/2018 | Gadnis et al. | |
| 2019/0012637 A1 | 1/2019 | Gillen | |
| 2019/0028277 A1 | 1/2019 | Jayachandran et al. | |
| 2019/0207951 A1 | 7/2019 | Oberhauser et al. | |
| 2019/0295078 A1 | 9/2019 | Bae | |
| 2020/0076601 A1 | 3/2020 | Tabrizi | |
| 2020/0119904 A1 | 4/2020 | Philyaw et al. | |
| 2020/0145229 A1 | 5/2020 | Li et al. | |
| 2020/0218795 A1* | 7/2020 | Antar | H04L 9/0643 |
| 2020/0311724 A1* | 10/2020 | Dunjic | H04L 9/30 |
| 2021/0073913 A1* | 3/2021 | Ingargiola | G06Q 20/065 |
| 2021/0203661 A1* | 7/2021 | Sankey | H04L 9/3247 |
| 2021/0295303 A1* | 9/2021 | Phan | G06Q 20/409 |

FOREIGN PATENT DOCUMENTS

| | | | |
|---|---|---|---|
| EP | 3671495 A1 | 6/2020 | |
| KR | 101871467 B1 * | 6/2018 | |
| WO | WO-2006055975 A2 * | 5/2006 | G06Q 40/02 |
| WO | 2014201059 A1 | 12/2014 | |
| WO | 2017066002 A1 | 4/2017 | |

OTHER PUBLICATIONS

A. Kiran, S. Dharanikota and A. Basava, "Blockchain based Data Access Control using Smart Contracts," TENCON 2019—2019 IEEE Region 10 Conference (TENCON), 2019, pp. 2335-2339, doi: 10.1109/TENCON.2019.8929451. (Year: 2019).*

Papernik, C. et al., "Information Security Using Data Control Ledgers," U.S. Appl. No. 17/028,904, filed Sep. 22, 2020, 74 pages.

Papernik, C. et al., "Information Security Using Integrated Data Control Ledgers," U.S. Appl. No. 17/028,952, filed Sep. 22, 2020, 77 pages.

Papernik, C. et al., "Error Correction for Integrated Data Control Ledgers," U.S. Appl. No. 17/028,976, filed Sep. 22, 2020, 76 pages.

* cited by examiner

502B

```
ACCOUNT_TRANSACTION_EVENT_ID = E2

{
    "accountTransaction": {
        "id": "T1",
        "event": {
            "processedBy": "Account Transaction Store",
            "processedOn": "2019-12-12T17:46:17.664-0500",
            "status": "PENDING_REVIEW"
        },
        "request": {
            "type": "Add",
            "account": {
                "name": "NBS1234",
                "type": "Service Account",
                "store": "store location",
                "enabled": true,
                "identity": {
                    "primaryOwner": "ZK611ZV",
                    "secondaryOwner": "ZK611ZJ",
                    "applicationId": 71015
                }
            },
            "source": {
                "system": "ARM",
                "ref": "17049606"
            }
        }
    }
}
```

602 brackets the "accountTransaction" id and event section.
300 brackets the request section.

FIG. 7

```
ACCOUNT_TRANSACTION_EVENT_ID = E3
{
  "accountTransaction": {
    "id": "T1",
    "event": {
      "processedBy": "Validation",
      "processedOn": "2019-12-12T17:46:17.664-0500",
      "status": "INVALID",
      "messages": [
        {
          "code": "VLD101",
          "description": "The Application ID does not exist"
        },
        {
          "code": "VLD102",
          "description": "The Secondary Owner is not valid"
        },
        {
          "code": "VLD103",
          "description": "Either a valid AIT must be supplied or valid Primary and Secondary owners must be supplied"
        }
      ]
    },
    "request": {
      "type": "Add",
      "account": {
        "name": "NBS1234",
        "type": "Service Account",
        "store": "store location",
        "enabled": true,
        "identity": {
          "primaryOwner": "ZK611ZV",
          "secondaryOwner": "ZK611Z",
          "applicationId": 71015
        }
      }
    },
    "source": {
      "system": "ARM",
      "ref": "17049606"
    }
  }
}
```

```
ACCOUNT_TRANSACTION_EVENT_ID = E5

{
    "accountTransaction": {
        "id": "T1",
        "event": {
            "processedBy": "Provisioning",
            "processedOn": "2019-12-12T17:46:17.664-0500",
            "status": "CONFIRMED",
            "messages": [
                {
                    "code": "CON01",
                    "description": "Account Created in AD by IIQ"
                }
            ]
        },
        "request": {
            "type": "Add",
            "account": {
                "name": "NBS1234",
                "type": "Service Account",
                "store": "store location",
                "enabled": true,
                "identity": {
                    "primaryOwner": "ZK611ZV",
                    "secondaryOwner": "ZK611ZJ",
                    "applicationId": 71015
                }
            },
            "source": {
                "system": "ARM",
                "ref": "17049606"
            }
        }
    }
}
```

602 brackets the "event" block; 300 brackets the "request" block. 502F labels the overall box.

FIG. 13

ERROR CORRECTION FOR DATA CONTROL LEDGERS

TECHNICAL FIELD

The present disclosure relates generally to information security, and more specifically to information security using data control ledgers.

BACKGROUND

In a network environment, network devices are in data communication with other network devices that may be distributed anywhere in the world. These network environments allow data and information to be shared among network devices. One of the technical challenges that occur when data is exchanged between network devices is controlling data leakage, unauthorized access to data, and preventing malicious activities. Data storing network devices, such as databases and file repositories, are vulnerable to online attacks while they are connected to other network devices to exchange data. This vulnerability poses several network security challenges. In conventional systems, if a network device becomes compromised (e.g. hacked) by a malicious actor, data storing network devices connected to compromised network devices are vulnerable to attacks because connections between the compromised network device and the data storing network devices can be exploited to exfiltrate data and/or to upload malicious data.

SUMMARY

The system disclosed in the present application provides a technical solution to the technical problems discussed above by using data control devices and data control ledgers to track and to manage service requests between network devices and provisioning service devices that contain user account information. The system includes a data control device that uses a data control ledger to keep track of service requests and any actions that are performed on the user account based on the service request. This process creates an immutable log that can be used to track changes to a user account over time and that can be used to correct discrepancies on a user account. In this configuration, network devices send service requests to the data control device for processing instead of sending service requests directly to provisioning service devices that contain sensitive user account information. This configuration provides an extra layer of information security since network devices are not interacting directly with provisioning service devices. This configuration also provides additional information security since a network device does not have complete knowledge about the provisioning service devices that are associated with a user account. This means that in the event that a network device becomes compromised by a bad actor, the bad actor will be unable to directly modify the user account information that is stored in a provisioning service device or exfiltrate data from a provisioning service device.

In some embodiments, the system may be configured to use an integrated data control ledger architecture. The integrated data control ledger architecture is a network of data control ledgers that allows changes in one data control ledger to drive changes in other related data control ledgers. For example, updating information for a user account in one data control ledger may trigger changes to other data control ledgers that are associated with the user account. This process uses a first data control ledger to track certain aspects of a user account that are associated with a particular group within an enterprise and one or more other data control ledgers that are stored in different devices to track other aspects of the user account that are associated with other groups within the enterprise. Using the integrated data control ledger architecture, the data control devices are able to provide end-to-end tracking from when a service request is received until its requested service has been completed by all of the other data control devices. This process creates a record that can be used at a later time to resolve discrepancies with a user account and/or to troubleshoot issues that are associated with the processing of a service request. For example, the data control ledgers can be used to identify which data control devices and groups contain information that conflicts with the information in a provisioning service device. This process allows different aspects of a user account to be compartmentalized so they can be individually adjusted by their respective groups within the enterprise. This is in contrast to existing systems where a single group may be responsible for making all of the changes to a user account. This process allows for individual changes to be made without affecting other groups which improves the efficiency of the system.

In one embodiment, the system is configured to use a data control ledger to create records of service requests that are received and modifications that are made to user accounts based on the received service requests. In this configuration, the system comprises a data control device that is configured to receive a service request for modifying a user account. The device is further configured to add an entry in a service request log and an event log in response to receiving the service request. The device is further configured to query a status log to determine a current status of the user account. The device is further configured to apply modification instructions from the service request to the current status of the user account to update the current status of the user account and to modify the current status of the user account in the status log. The device is further configured to identify a provisioning service device that is associated with the user account, to determine service instructions for the provisioning service device based on the updated current status of the user account, and to send the service instructions to the provisioning service device.

In another embodiment, the system is configured to employ an error-correcting process to identify and to correct conflicting information between the information that is stored in a data control ledger and the information that is stored in a provisioning service device. In this configuration, the system comprises a data control device that is configured to receive a first current status for a user account from a provisioning service device. The device is further configured to query a status log using to determine a second current status of the user account. The device is further configured to compare the first current status for the user account from the provisioning service device to the second current status of the user account in the status log, to determine the first current status for the user account does not match the second current status of the user account, and to update one of the status log and the provisioning service device in response to determining that the first current status for the user account does not match the second current status of the user account.

In another embodiment, the system is configured to use an integrated data control ledger architecture to record and to manage changes to user accounts among multiple groups within an enterprise. In this configuration, the system comprises a data control device that is configured to receive a service request for modifying a user account. The device is further configured to add an entry in a service request log and in an event log in response to receiving the first service request. The device is further configured to apply the modifications instructions from the service request to a current status of the user account in a status log and to modify the current status of the user account in the status log. The device is further configured to determine a second data control device is associated with the user account. The device is further configured to determine the first set of service instructions based on the updated first current status of the user account, to generate a second service request that comprises the first set of service instructions, and to send the second service request to the second network device.

In another embodiment, the system is configured to employ an error-correcting process to identify and to correct conflicting information between the information that is stored in an integrated data control ledger architecture and the information that is stored in a provisioning service device. In this configuration, the system comprises a data control device that is configured to receive a first current status for a user account from the provisioning service device. The device is further configured to send a query to a plurality of data control devices to determine a second current status for the user account from the status logs of the plurality of data control devices. The device is further configured to determine the first current status for the user account from the provisioning service device does not match a second current status of the user account from a status log of a first data control device from among the data control devices. The device is further configured to update one of the status log of the first data control device and the provisioning service device in response to determining that the first current status for the user account does not match the second current status of the user account.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is an example of an entry that is stored in an event log before validating a service request;

FIG. 8 is an example of an entry that is stored in an event log after a service request fails validation;

FIG. 13 is an example of an entry that is stored in an event log after receiving a confirmation message from a provisioning service device;

DETAILED DESCRIPTION

System Overview

Figure 1:
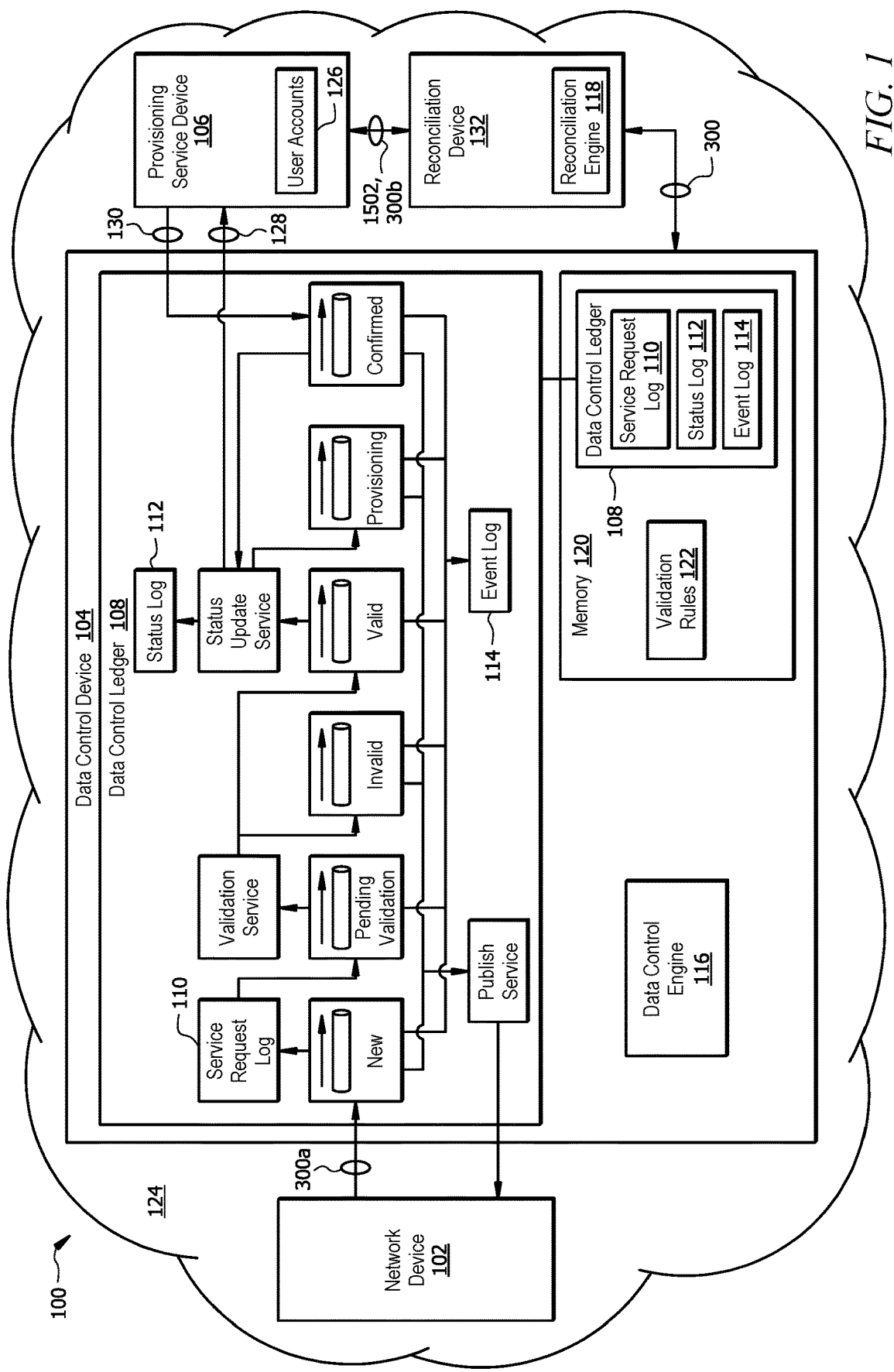
FIG. 1 is a schematic diagram of a data control system that is configured to use data control ledgers.

FIG. 1 is a schematic diagram of a data control system 100 that is configured to use data control ledgers 108. In one embodiment, the system 100 comprises one or more network devices 102, a data control device 104, a provisioning service device 106, and a reconciliation device 132 that are in signal communication with each other within a network 124. The system 100 may be configured as shown in FIG. 1 or in any other suitable configuration. The network 124 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 124 may be configured to support any suitable type of communication protocol as would be appreciated by one of ordinary skill in the art.

The data control system 100 is generally configured to use a data control device 104 to monitor and to track service requests 300*a* that are sent by a network device 102 to a provisioning service device 106. Examples of network devices 102 include, but are not limited to, computers, laptops, tablets, smartphones, databases, memories, servers, or any other suitable type of networking device. A service request 300 comprises instructions for modifying a user account 126 that is stored or maintained by a provisioning service device 106. Examples of user accounts 126 include, but are not limited to, information technology accounts, employee accounts, computer system accounts, streaming service accounts, virtual machine accounts, financial accounts, or any other suitable type of account. For example, a service request 300 may comprise instructions to adjust the permissions or settings for a user's computer or network settings, changing account information, instructions for modifying an account balance, or any other suitable type of instructions.

In this configuration, the system 100 uses the data control device 104 to create an immutable record that can be used for error-correcting information that is associated with a user account 126. The data control device 104 is generally configured to process the service request 300*a* to determine service instructions 128 that are sent to the provisioning service device 106 to modify a user account 126. The data control device 104 is configured to use a data control ledger 108 to track the current status of a plurality of user accounts 126. The data control ledger 108 keeps a record of service requests 300a and actions that are performed on user accounts 126. Using the data control device 104 and the data control ledger 108 creates a log that can be used to track changes to a user account 126 and that can be used to correct discrepancies on a user account 126.

Provisioning Service Devices

The provisioning service device 106 may be one or more network devices that are configured to store and to manage a plurality of user accounts 126. Examples of provisioning service devices 106 include, but are not limited to, computers, databases, memories, servers, or any other suitable type of networking device. For example, the provisioning service device 106 may be a database that is configured to store information that is associated with a plurality of user accounts 126 for an enterprise (e.g. a business). The provisioning service device 106 is further configured to modify a user account 126 in response to receiving service instructions 128 from a data control device 104. As an example, the provisioning service device 106 may be associated with an information technology group within an enterprise. In this example, the provisioning service device 106 is configured to store network permission settings for a user account 126. The provisioning service device 106 is configured to adjust the network permission settings for the user account 126 based on service instructions 128 instructions that are provided by a data control device 104. In other examples, the provisioning service device 106 may be associated with any other type of group within an enterprise.

Reconciliation Device

Examples of a reconciliation device 132 include, but are not limited to, computers, databases, servers, or any other suitable type of networking device. The reconciliation device 132 comprises a reconciliation engine 118 that is generally configured to identify differences between user account information that is stored in a provisioning service device 106 and user account information stored in a data control ledger 108. The reconciliation engine 118 is further configured to generate a service request 300b that comprises instructions for resolving any identified differences. As an example, the reconciliation engine 118 may generate a service request 300 that instructs the data control device 104 to modify the information for a user account 126 in a data control ledger 108. As another example, the reconciliation engine 118 may generate a service request 300 that is processed by the data control device 104 to instruct the provisioning service device 106 to modify the information for a user account 126 that is stored in the provisioning service device 106. Examples of the reconciliation engine 118 in operation are described in FIGS. 14 and 17. In FIG. 1, the reconciliation device 132 is shown as a standalone device. In some embodiments, the functionality of the reconciliation device 132 may be integrated within the data control device 104. For example, the reconciliation engine 118 may be implemented within a data control device 104.

Data Control Device

Examples of a data control device 104 include, but are not limited to, computers, databases, servers, or any other suitable type of networking device. The data control device 104 comprises a data control engine 116 and a memory 120. The data control device 104 may be configured as shown or in any other suitable configuration. Additional information about the hardware configuration of the data control device 104 is described in FIG. 18. The memory 120 is configured to store a data control ledger 108, validation rules 122, and/or any other suitable type of data.

Validation Rules

The validation rules 122 comprise a set of rules or requirements that should be satisfied for the data control device 104 to determine that a service request 300 is valid. As an example, a validation rule 122 may indicate that a service request 300 is valid when the service request 300 identifies a user account 126 that is associated with at least a minimum number of account owners. As another example, a validation rule 122 may indicate that a service request 300 is valid when the service request 300 comes from a known or trusted source. As another example, a validation rule 122 may indicate that a service request 300 is valid when the service request 300 indicates an approved type of action to perform on a user account 126. As another example, a validation rule 122 may indicate that a service request 300 is valid when the service request 300 is received within a predetermined time window. In other examples, a validation rule 122 may identify any other suitable type of criteria or combination of criteria for determining that a service request 300 is valid.

Data Control Ledger

In one embodiment, a data control ledger 108 comprises a service request log 110, a status log 112, and an event log 114. An example of the data flow path between the service request log 110, the status log 112, and the event log 114 is shown in FIG. 1. This example illustrates how a service request 300 may be processed to generate service instructions 128 that are sent to a provisioning service device 106. A description of this process is described below in FIG. 2.

Service Request Log

Figure 4:
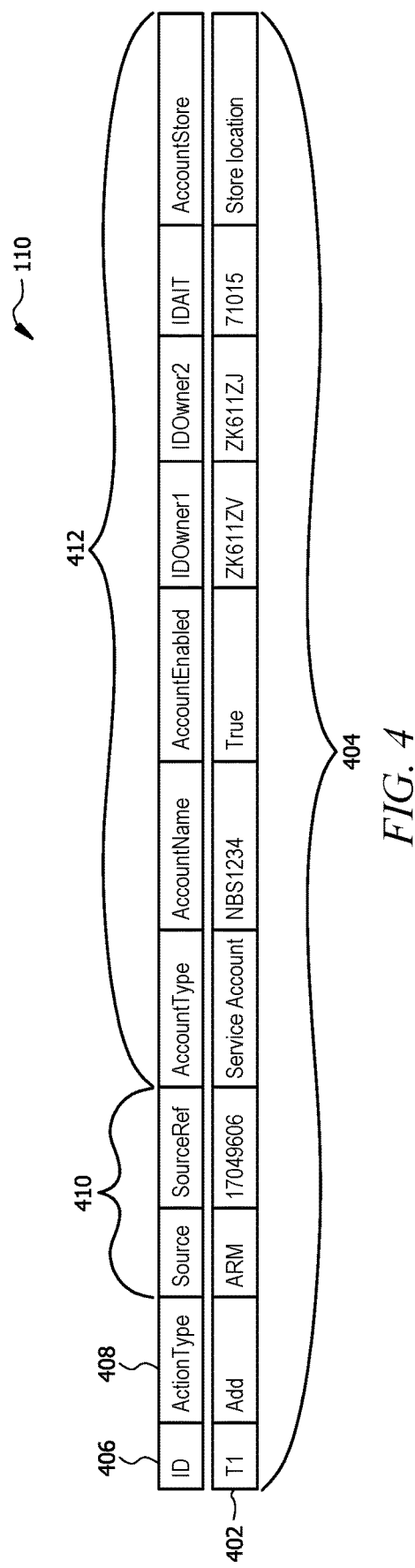
FIG. 4 is an example of a service request log portion of a data control ledger.

The service request log 110 is configured to store information about any service requests 300 that are received by the data control device 104. An example of a service request log 110 is shown in FIG. 4. Referring to the example in FIG. 4, each entry 402 in the service request log 110 is associated with a service request 300 that was received by the data control device 104. Each entry 402 comprises a plurality of fields 404 that can be used to store information that is associated with a service request 300. As an example, an entry 402 may comprise a service request identifier field 406, an action type field 408, source information fields 410, user account information fields 412, and/or any other suitable type of fields. In this example, the service request identifier field 406 is configured to store a unique identifier that is associated with a service request 300. The action type field 408 is configured to indicate a type of action that is requested to be performed on a user account 126. The source information fields 410 are configured to store information about a source of the service request 300. For example, the source information fields 410 may be configured to store a source identifier that uniquely identifies the source of the service request 300. The user account information fields 412 are configured to store information that identifies a user account 126. For example, the user account information fields 412 may be configured to store a user account identifier, a user account type, location information for a user account, information about the owners associated with a user account, and/or any other suitable type of information that is associated with a user account 126.

Status Log

Figure 11:
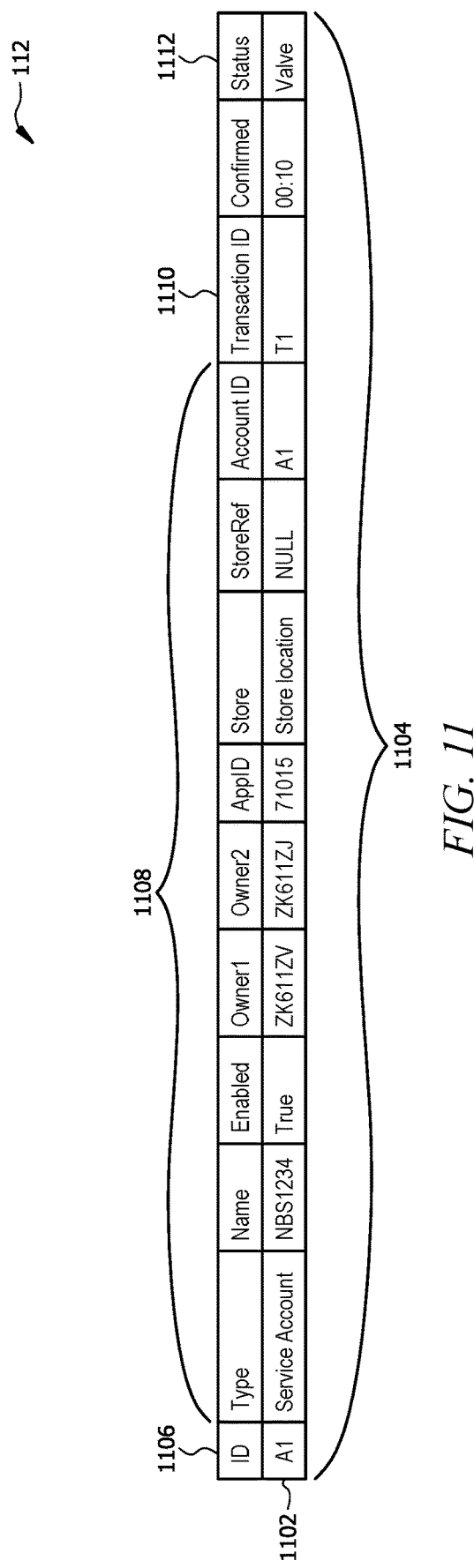
FIG. 11 is an example of a status log portion of a data control ledger.

Returning to FIG. 1, the status log 112 is configured to store the current status of a user account 126. An example of a status log 112 is shown in FIG. 11. Referring to the example in FIG. 11, each entry 1102 is associated with a user account 126. Each entry 1102 comprises a plurality of fields 1104 that can be used to store information that is associated with a user account 126. As an example, an entry 1102 may comprise an entry identifier field 1106, account information fields 1108, a service request identifier field 1110, a current status field 1112, and/or any other suitable type of field. In this example, the entry identifier field 1106 uniquely identifies an entry 1102 within the status log 112. The account information fields 1108 are configured to store information that identifies a user account 126. For example, the account information fields 1108 may be configured to store an account type, an account identifier, information about the owners of a user account, location information for a user account, and/or any other suitable type of information that is associated with a user account 126. The service request identifier field 1110 may be configured to store information that identifies the most recent service request 300 that was received for a user account 126. The current status field 1112 may be configured to store the current state or status of a user account 126. As an example, the current status field 1112 may be configured to indicate one or more account balances. As another example, the current status field 1112 may be configured to account settings (e.g. network settings or computer settings). As another example, the current status field 1112 may be configured to indicate a set of accounts that are associated with a user account 126. In other examples, the current status field 1112 may be configured to indicate any other suitable type of state or status of a user account 126.

Event Log

Figure 5:
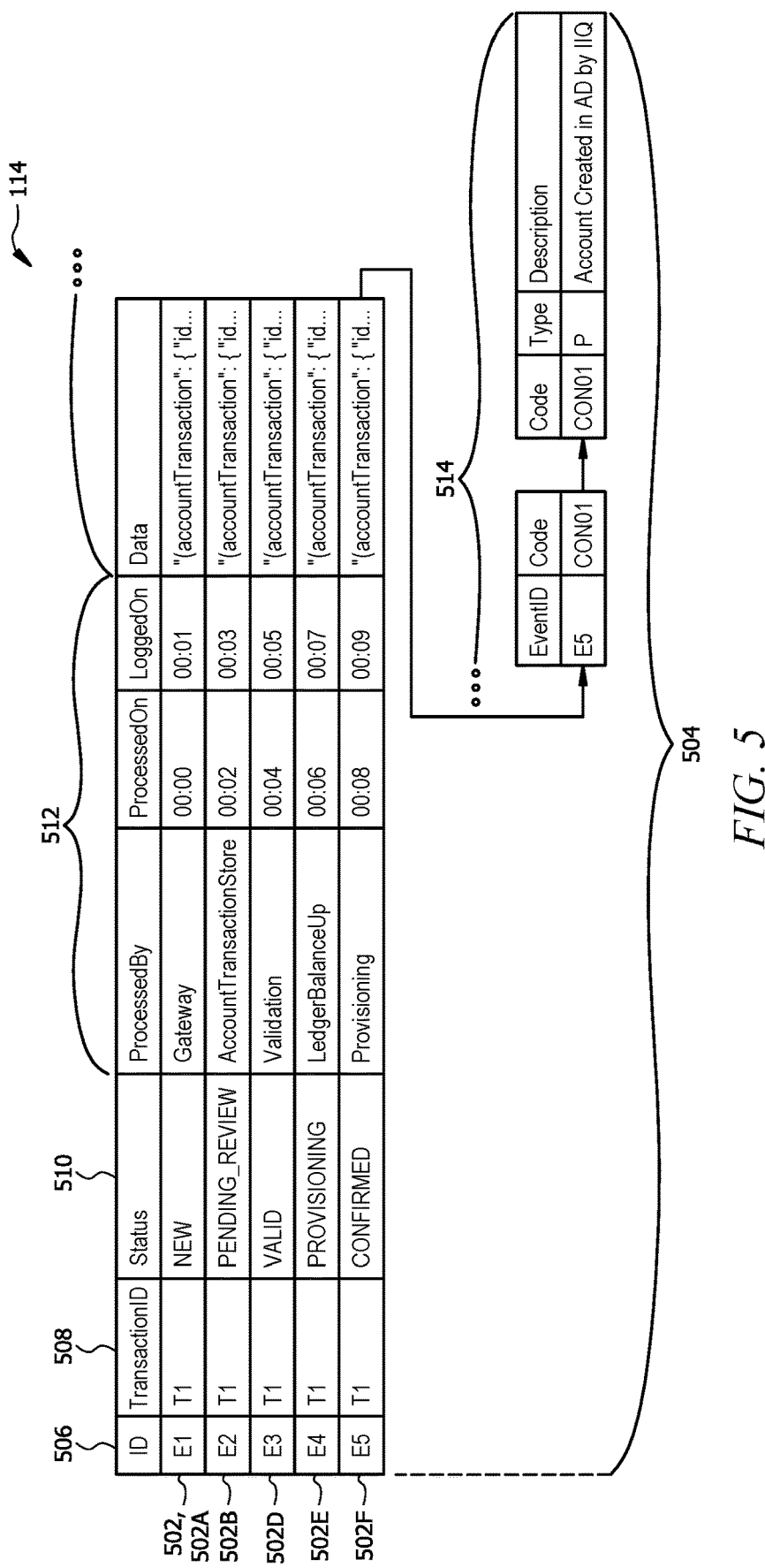
FIG. 5 is an example of an event log portion of a data control ledger.

Returning to FIG. 1, the event log 114 is configured to store information that is associated with events that occur while processing a service request 300. An example of an event log 114 is shown in FIG. 5. Referring to the example in FIG. 5, each entry 502 in the event log 114 is associated with an event or action that occurs while processing a service request 300. Each entry 502 comprises a plurality of fields 504 that can be used to store information about processing a service request 300. As an example, an entry 502 may comprise an entry identifier field 506, a service request identifier field 508, a status field 510, processing information fields 512, metadata fields 514, and/or any other suitable type of fields. In this example, the entry identifier field 506 uniquely identifies an entry 502 within the event log 114. The service request identifier field 508 is configured to store a unique identifier that is associated with a service request 300. The status field 510 is configured to indicate the current status of a service request 300 that is being processed. Examples of statuses for a service request 300 include, but are not limited to, new, pending review, valid, invalid, provisioning, confirmed, and/or any other suitable type of status for a service request 300. The processing information fields 512 are configured to store information that is associated with the processing of a service request 300. For example, the processing information fields 512 may identify a device or entity that is performing an operation on the service request and a timestamp that is associated when the service request 300 was being operated on. The metadata fields 514 are configured to store additional information that is associated with the processing of a service request 300. For example, the metadata fields 514 may provide information about reasons why a service request 300 failed validation. In other examples, the metadata fields 514 may be configured to store any other suitable type of information that is associated with the processing of a service request 300.

Data Control Engine

The data control engine 116 is generally configured to process a service request 300 to determine a set of service instructions 128. The service instructions 128 comprise information or commands that are sent to the provisioning service device 106 to modify a user account 126. The data control engine 116 is further configured to use a data control ledger 108 to track the current status of a user account 126. The data control engine 116 uses the data control ledger 108 to keep track of service requests 300 and any actions that are performed on the user account 126. This process creates an immutable log that can be used to track changes to a user account 126 over time and that can be used to correct discrepancies on a user account 126. Examples of the data control engine 116 in operation are described in FIGS. 2 and 16.

Data Control Process

Figure 2:
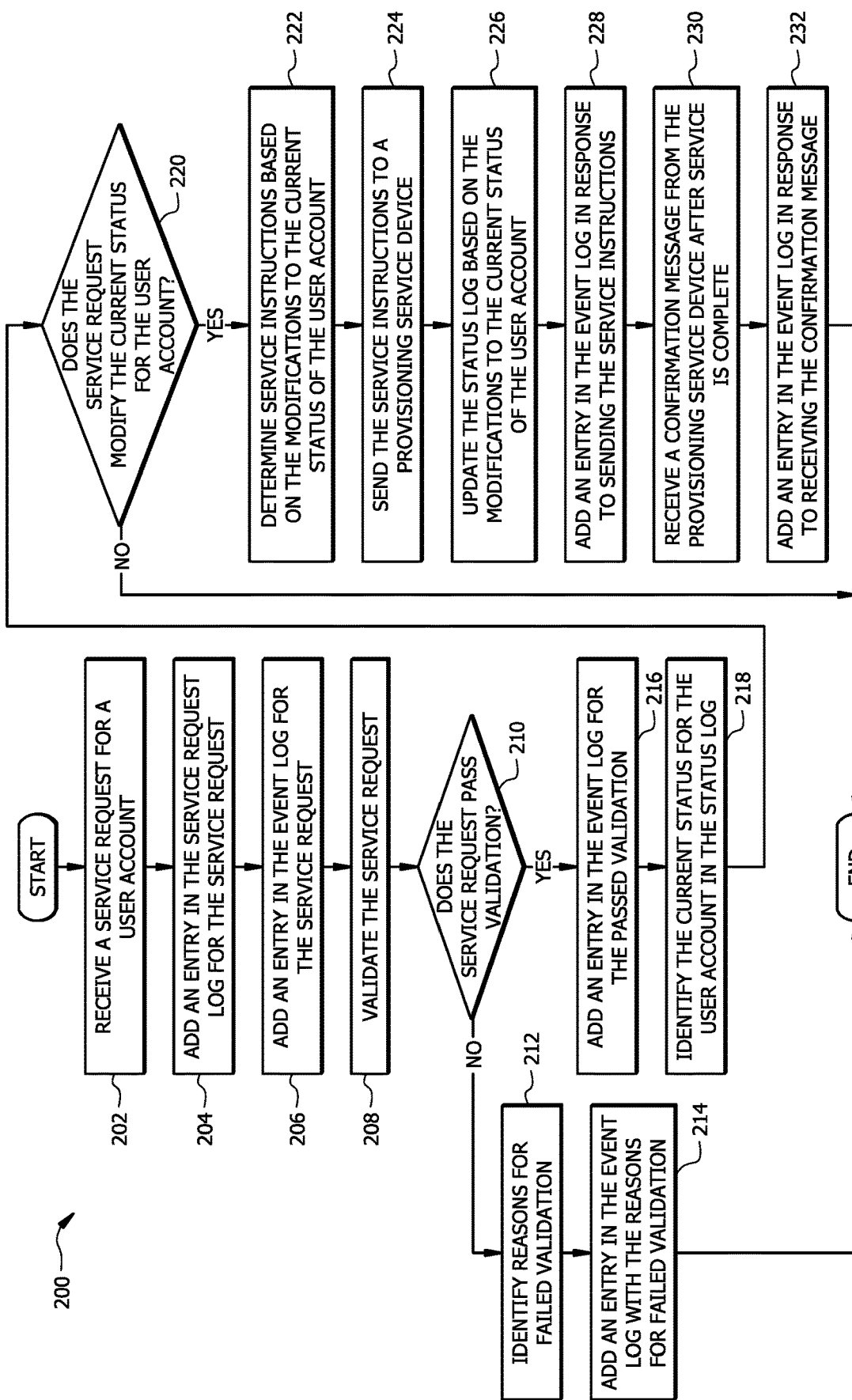
FIG. 2 is a flowchart of an embodiment of a data control process using a data control ledger.

FIG. 2 is a flowchart of an embodiment of a data control process 200. A data control device 104 may employ process 200 to process a service request 300 to generate service instructions 128 that are sent to a provisioning service device 106 to modify a user account 126. This process uses the data control ledger 108 to track the current status of a user account 126 based on the requested modifications to the user account 126.

This configuration provides an extra layer of information security since network devices 102 are not interacting directly with provisioning service devices 106. This configuration also provides additional information security since a network device 102 does not have complete knowledge about the provisioning service devices 106 that are associated with a user account 126. This means that in the event that a network device 102 becomes compromised by a bad actor, the bad actor will be unable to directly modify the user account information that is stored in a provisioning service device 106.

Figure 3:
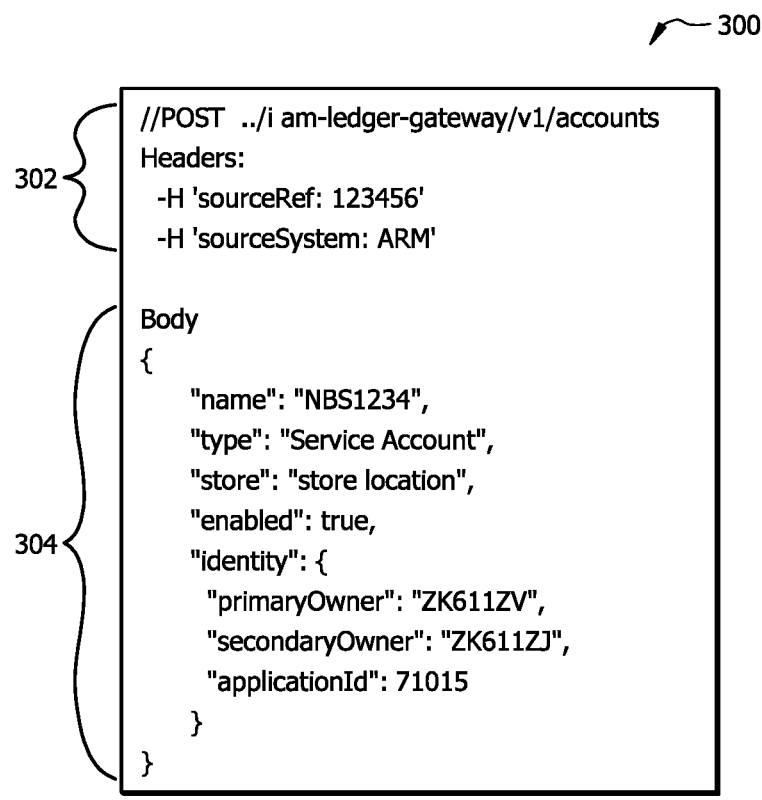
FIG. 3 is an example of a service request.

At step 202, the data control device 104 receives a service request 300 for a user account 126. The service request 300 is configured to provide information about a requested action to perform on a user account 126. Referring to FIG. 3 as an example, the service request 300 may comprise a header portion 302 and a body portion 304. In this example, the header portion 302 comprises information about a source for the service request 300. For example, the header portion 302 may comprise a source name and/or a source identifier. The source identifier may identify a person and/or device who sent the service request 300 and/or the network device 102 that was used to send the service request 300. The body portion 304 comprises information or instructions for modifying a user account 126. For example, the body portion 304 may comprise a service request identifier, an action type, an account identifier for a user account, instructions for modifying a user account 126, and/or any other suitable type of information that is associated with modifying a user account 126. The service request identifier may be any suitable type of identifier (e.g. an alphanumeric identifier) that uniquely identifies the service request 300. The action type identifies a type of action that is being requested in the service request 300. For example, an action type may correspond with creating a new account, removing an existing account, modifying an account, or performing any other suitable type of action on a user account 126. The account identifier may be any suitable type of identifier (e.g. an alphanumeric identifier) that uniquely identifies a user account 126 to be modified. The modification instructions may comprise instructions or commands for how to modify a user account 126.

As an example, a network device 102 may send a service request 300 to the data control device 104 with instructions for modifying a user account 126. The header portion 302 of the service request 300 may identify the network device 102 as the source of the service request 300. The body portion 304 of the service request 300 may identify a particular user account 126 and provide instructions for modifying the user account 126. For example, the service request 300 may comprise instructions for adding a new account to the user account 126, removing an existing account from the user account 126, increasing a balance of a user account 126, decreasing a balance of a user account 126, changing settings or permissions for a user account 126, changing account information that is associated with a user account 126, or any other suitable type of instructions for modifying a user account 126.

Returning to FIG. 2 at step 204, the data control device 104 adds an entry 402 in the service request log 110 for the service request 300. Here, the data control device 104 creates a new entry 402 in the service request log 110 in response to receiving the service request 300. The data control device 104 populates the entry 402 with information about the service request 300 that was received. Referring to the example in FIG. 4, the data control device 104 creates a new entry 402 in the service request log 110 for the received service request 300. In this example, the data control device 104 populates the service request identifier field 406 with a unique identifier for the service request 300. The data control device 104 populates the action type field 408 to indicate that a new account is being requested. The data control device 104 populates the source information fields 410 to identify where the service request 300 came from. The data control device 104 populates the user account information fields 412 with information about the user account 126 that is to be associated with the new account.

Returning to FIG. 2 at step 206, the data control device 104 adds an entry 502 in the event log 114 in response to receiving the service request 300. Here, the data control device 104 begins creating entries 502 in the event log 114 to keep track of the actions that are being performed on the service request 300. Referring to the example in FIG. 5, the data control device 104 creates an entry 502A that indicates that a new service request 300 was received. In this example, the data control device 104 populates the entry identifier field 506 with a unique identifier for the entry 502A. The data control device 104 populates the service request identifier field 508 with the unique identifier for the service request 300. The data control device 104 populates the status field 510 with a status that indicates the service request 300 is "new." The data control device 104 populates the processing information fields 512 with information about how the service request 300 was processed. For example, the processing information fields 512 may identify a timestamp for when the service request 300 was processed and the devices that were involved with processing the service request 300. The data control device 104 may populate the metadata fields 514 with any other information that is associated with the service request 300 and/or the processing of the service request 300.

Figure 6:
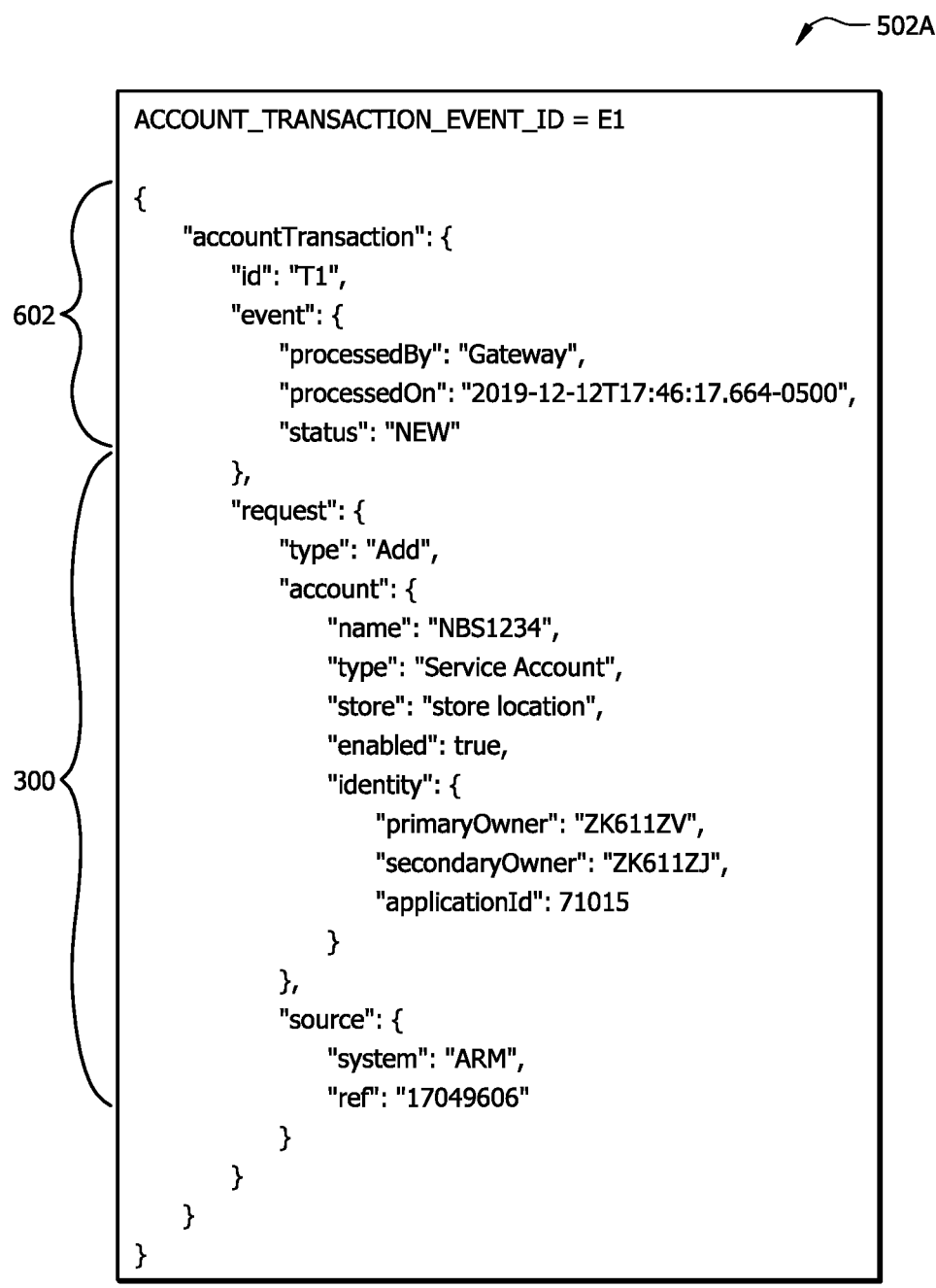
FIG. 6 is an example of an entry that is stored in an event log after receiving a service request.

FIG. 6 shows another example of the entry 502A that may be stored in the event log 114. In this example, the entry 502A comprises processing information 602 that is linked with a copy of the service request 300. For example, the copy of the service request 300 may be appended or concatenated with the processing information 602 for the service request 300. The processing information 602 comprises information that is associated with the processing of the service request 300. For example, the processing information 602 may identify a device or entity that is performing an operation on the service request and a timestamp that is associated when the service request 300 was being operated on. In this example, the processing information 602 also indicates that the status of the service request 300 is "new." The processing information 602 may comprise any information from the entry 502A that was previously described above.

After creating the entry 502A that indicates that a new service request 300 was received, the data control device 104 also adds an entry 502B to the event log 114 that indicates that the service request 300 is pending a validation review. The validation review process is described below in step 208. Returning to the example in FIG. 5, the data control device 104 creates an entry 502B that indicates the service request 300 is pending validation review. In this example, the data control device 104 populates the entry identifier field 506 with a unique identifier for the entry 502B. The data control device 104 populates the service request identifier field 508 with the unique identifier for the service request 300. The data control device 104 populates the status field 510 with a status that indicates that the service request 300 is "pending review." The data control device 104 populates the processing information fields 512 with information about how the service request 300 was processed. The data control device 104 may populate the metadata fields 514 with any other information that is associated with the service request 300 and/or the processing of the service request 300.

FIG. 7 shows another example of the entry 502B that may be stored in the event log 114. In this example, the data control device 104 modifies the status of the service request 300 within the processing information 602 to indicate that the status of the service request 300 is "pending review." The data control device 104 may also update any other processing information 602 with any other details about the validation process review. The portion of the entry 502B that included the copy of the service request 300 remains unchanged.

Returning to FIG. 2 at step 208, the data control device 104 validates the service request 300. Here, the data control device 104 applies one or more validation rules 122 to the service request 300 to determine whether the service request 300 is valid. As an example, a validation rule 122 may indicate that a service request 300 is valid when the service request 300 identifies a user account 126 that is associated with at least a minimum number of account owners. As another example, a validation rule 122 may indicate that a service request 300 is valid when the service request 300 comes from a known or trusted source. As another example, a validation rule 122 may indicate that a service request 300 is valid when the service request 300 indicates an approved type of action to perform on a user account 126. As another example, a validation rule 122 may indicate that a service request 300 is valid when the service request 300 is received within a predetermined time window. The data control device 104 may apply any suitable type and/or combination of validation rules 122 to the service request 300 to determine whether the service request 300 is valid.

At step 210, the data control device 104 determines whether the service request 300 passes validation. The data control device 104 proceeds to step 212 in response to determining that the service request 300 does not pass validation. At step 212, the data control device 104 identifies reasons why the service request 300 failed validation. For example, the service request 300 may fail validation because the user account 126 does not exist, one of the owners is not valid, the source is not a trusted source, the requested action is not an approved action type, or any other suitable reason.

Figure 9:
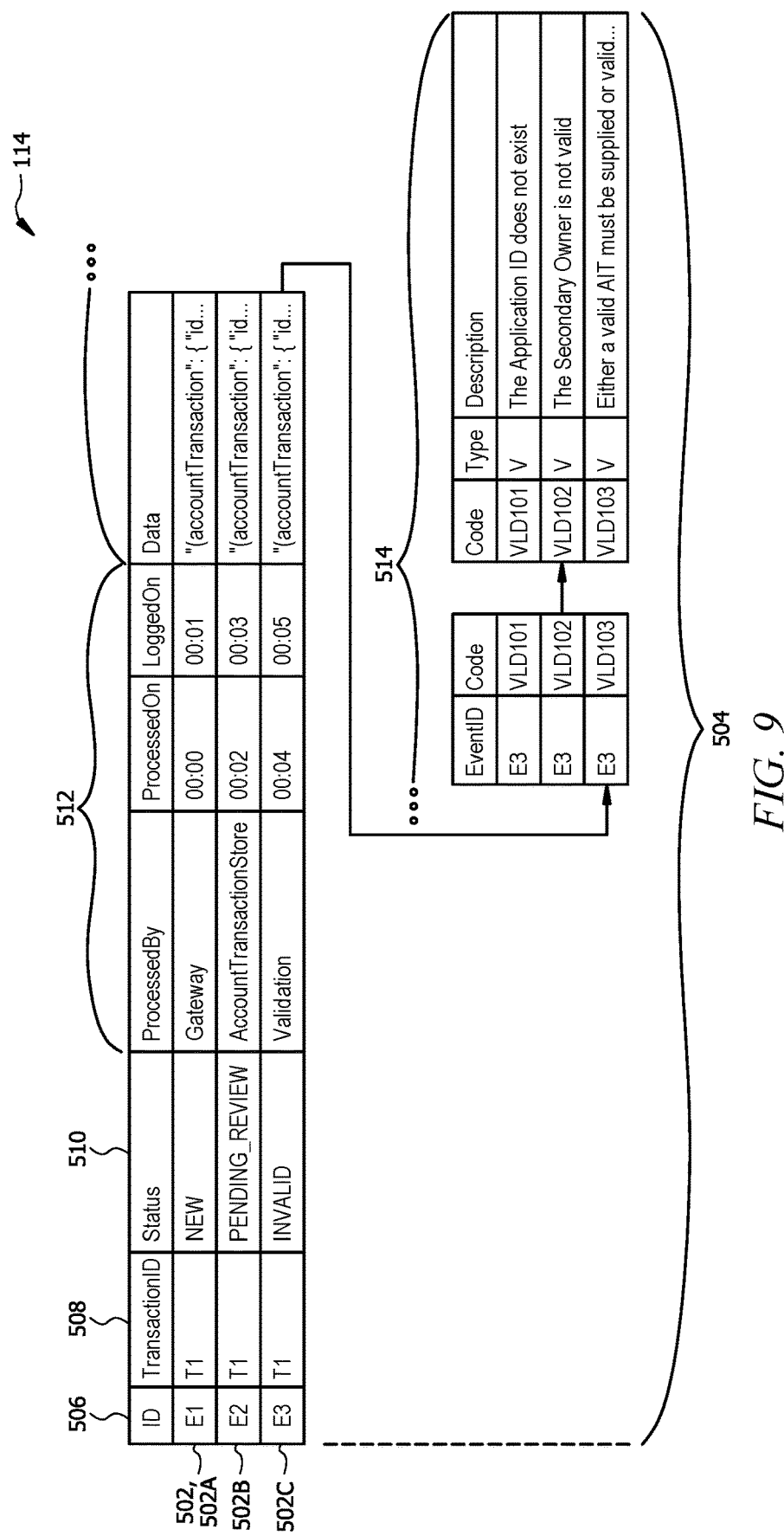
FIG. 9 is an example of an event log with an entry after a service request fails validation.

At step 214, the data control device 104 adds an entry 502C in the event log 114 with the reasons why the service request 300 failed validation. Here, the data control device 104 adds an entry 502C to the event log 114 to indicate that the service request 300 has failed validation and that the service request 300 will no longer be processed. Referring to the example in FIG. 9, the data control device 104 creates an entry 502C that indicates the service request 300 has failed validation. In this example, the data control device 104 populates the entry identifier field 506 with a unique identifier for the entry 502C. The data control device 104 populates the service request identifier field 508 with the unique identifier for the service request 300. The data control device 104 populates the status field 510 with a status that indicates that the service request 300 is "invalid." The data control device 104 populates the processing information fields 512 with information about how the service request 300 was processed. The data control device 104 includes the reasons that the service request 300 failed validation within the metadata fields 514 of the entry 502C. For instance, the data control device 104 may include an error code identifier and a text description in the entry 502C.

FIG. 8 shows another example of the entry 502C that may be stored in the event log 114. In this example, the data control device 104 modifies the status of the service request 300 within the processing information 602 to indicate that the status of the service request 300 is "invalid." The data control device 104 also updates the processing information 602 to include information about the reasons why the service request 300 failed validation. The portion of the entry 502C that included the copy of the service request 300 remains unchanged.

Returning to FIG. 2 at step 210, the data control device 104 proceeds to step 216 in response to determining that the service request 300 passes validation. At step 216, the data control device 104 adds an entry 502D in the event log 114 after service request 300 passes validation. Here, the data control device 104 adds an entry 502D to the event log 114 to indicate that the service request 300 has passed validation. Returning to the example in FIG. 5, the data control device 104 populates the entry identifier field 506 with a unique identifier for the entry 502D. The data control device 104 populates the service request identifier field 508 with the unique identifier for the service request 300. The data control device 104 populates the status field 510 with a status that indicates that the service request 300 is "valid." The data control device 104 populates the processing information fields 512 with information about how the service request 300 was processed. The data control device 104 may populate the metadata fields 514 with any other information that is associated with the service request 300 and/or the processing of the service request 300.

Figure 10:
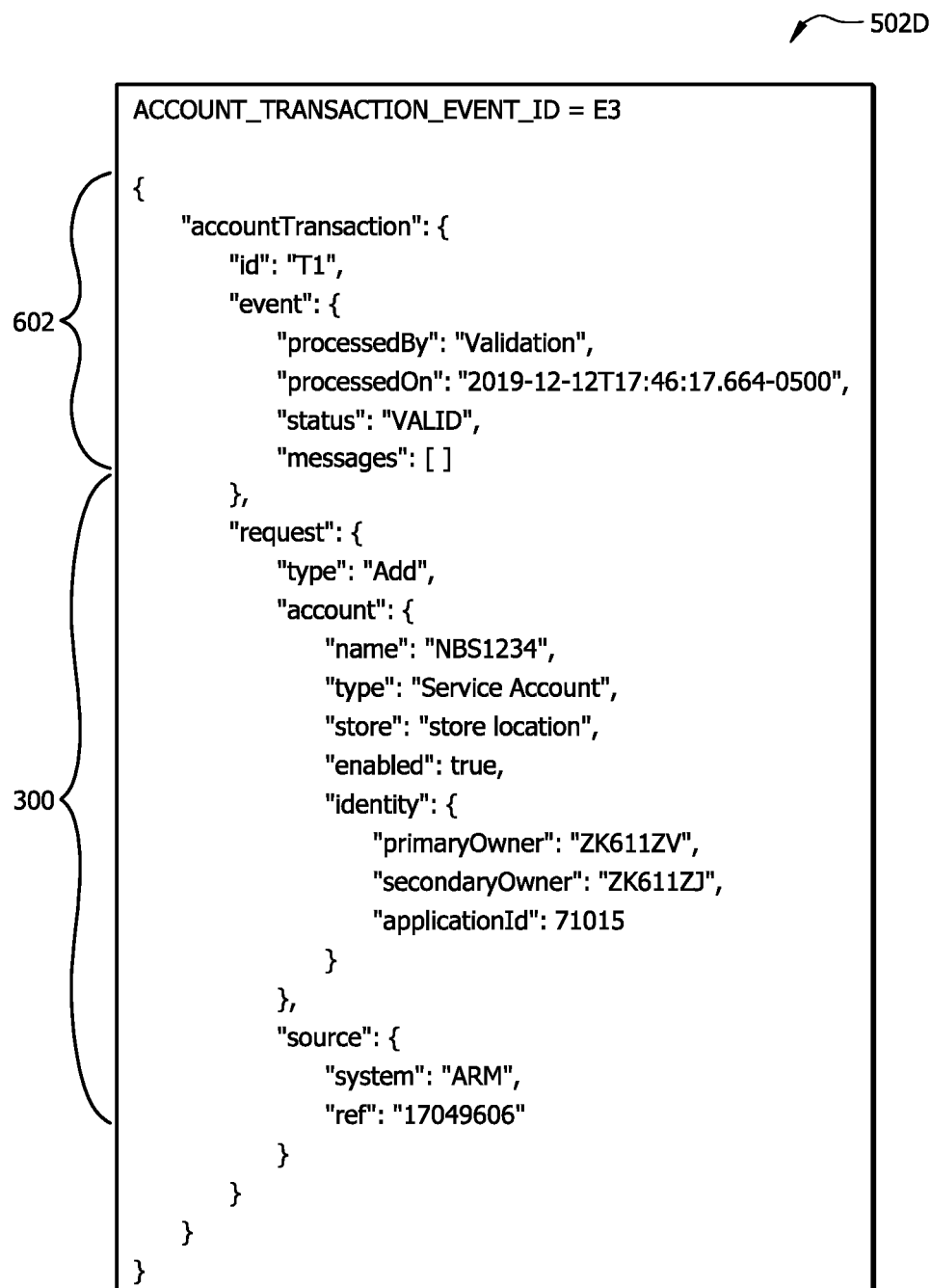
FIG. 10 is an example of an entry that is stored in an event log after a service request passes validation.

FIG. 10 shows another example of the entry 502D that may be stored in the event log 114. In this example, the data control device 104 modifies the status of the service request 300 within the processing information 602 to indicate that the status of the service request 300 is "valid." The portion of the entry 502D that included the copy of the service request 300 remains unchanged.

Returning to FIG. 2 at step 218, the data control device 104 identifies a current status for the user account 126 in the status log 112. The data control device 104 may use the account information from the service request 300 to query the status log 112 to determine the current status of the user account 126. For example, the data control device 104 may use an account identifier from the service request 300 as a search token to query the status log 112 for the current status of the user account 126. Referring to the example in FIG. 11, the data control device 104 may identify an entry 1102 in the status log 112 that corresponds with the account identifier for the user account 126. The data control device 104 may then identify the current status of the user account 126 from the status field 1112 of the entry 1102 in the status log 112. The status log 112 may identify an account balance, account settings, or any other current state of the user account 126.

Returning to FIG. 2 at step 220, the data control device 104 determines whether the service request 300 modifies the current status of the user account 126 in the status log 112. For example, the service request 300 may request a new account. In this example, the data control device 104 determines that the current status of the user account 126 will be modified to add a new account to the user account 126. As another example, the service request 300 may request removing an existing account. In this example, the data control device 104 determines that the current status of the user account 126 will be modified to remove an existing account from the user account 126. As another example, the service request 300 may indicate to increase or decrease to an account balance. In this example, the data control device 104 determines that the current status of the user account 126 will be modified to increase or decrease the account balance. As another example, the service request 300 may identify one or more settings or permissions for the user account 126. In this example, the data control device 104 will compare the settings or permission from the service request 300 to the settings or permission in the user account 126. The data control device 104 determines that the service request 300 modifies the current status of the user account 126 when one or more settings or permissions are different between the service request 300 and the current status of the user account 126. In other examples, the data control device 104 may use any other suitable criteria for determining whether the service request 300 modifies the current status of the user account 126.

The data control device 104 terminates process 200 in response to determining that the service request 300 does not modify the current status of the user account 126 in the status log 112. In this case, the data control device 104 determines that the current status of the user account 126 is up-to-date in the status log 112 and that no further action is necessary. Otherwise, the data control device 104 proceeds to step 222 in response to determining that the service request 300 modifies the current status of the user account 126 in the status log 112. In this case, the data control device 104 determines that the current status of the user account 126 should be modified or updated based on the service request 300. For example, the service request 300 may request an increase or decrease to account balance or changes to account settings for the user account 126.

At step 222, the data control device 104 determines service instructions 128 based on the modifications to the current status of the user account 126. For example, when the service request 300 comprises instructions for creating a new account, the data control device 104 will generate service instructions 128 that trigger the provisioning service device 106 to associate a new account with the user account 126. In this example, the service request 300 may comprise information for the new account such as an account type. The data control device 104 may include the account information and any other pertinent information from the service request 300 about the requested new account in the service instructions 128.

As another example, when the service request 300 comprises instructions for removing an existing account, the data control device 104 will generate service instructions 128 that trigger the provisioning service device 106 to remove an existing account. In this example, the service request 300 may comprise information that identifies the account that is to be removed. The data control device 104 may include an account identifier and any other pertinent information from the service request 300 about the requested account to remove in the service instructions 128.

As another example, when the service request 300 comprises instructions for increasing or decreasing an account balance, the data control device 104 will generate service instructions 128 that trigger the provisioning service device 106 to increase or decrease an account balance. In this example, the service request 300 may comprise information that identifies the account that is to be modified. The data control device 104 may include an account identifier and any other pertinent information from the service request 300 about the requested account to remove in the service instructions 128.

As another example, when the service instructions 128 comprise instructions for modifying one or more settings or permissions for a user account 126, the data control device 104 will generate service instructions 128 that trigger the provisioning service device 106 to modifying one or more settings or permissions for the user account 126. In this example, the service request 300 may comprise information that identifies the account to be modified and one or more setting or permission values for the user account 126. The data control device 104 may include an account identifier, the one or more setting or permission values for the user account 126, and any other pertinent information from the service request 300 about the requested account to remove in the service instructions 128.

In other examples, the data control device 104 may generate any other suitable type of service instructions 128 that triggers the provisioning service device 106 to modify a user account 126 in accordance with the information provided by the service request 300.

In some embodiments, the data control device 104 may generate service instructions 128 that are specific to a particular provisioning service device 106 or type of provisioning service device 106. For example, the service request 300 may comprise information that identifies a provisioning service device 106. In this case, the data control device 104 may first identify the provisioning service device 106 and/or the type of provisioning service device 106 based on the information provided by the service request 300. The data control device 104 may then determine a suitable type or format of service instructions 128 based on the identified provisioning service device 106. For instance, the provisioning service device 106 may only be configured to interpret instructions or commands that are in a particular programming language and/or format. The data control device 104 will identify the provisioning service device 106 and generate the service instructions 128 based on the identified provisioning service device 106 using the appropriate programming language and/or format. This process allows the data control device 104 to generate service instructions 128 that are in a different programming language and/or format that the instructions provided by the service request 300. This process allows the network device 102 to modify a user account 126 without knowledge of the programming language and/or format requirements of the provisioning service device 106.

At step 224, the data control device 104 sends the service instructions 128 to a provisioning service device 106. Here, the data control device 104 sends the service instructions 128 to the provisioning service device 106 to modify the user account 126. Sending the service instructions 128 triggers the provisioning service device 106 to modify the user account 126 in accordance with the service instructions 128. The data control device 104 may send the service instructions 128 to the provisioning service device 106 using an Application Programming Interface (API), messages, or any other suitable technique.

At step 226, the data control device 104 updates the status log 112 based on the modifications to the current status of the user account 126. Here, the data control device 104 updates that current status of the user account 126 within the status log 112. For example, the data control device 104 may increase or decrease an account balance in the for the user account 126 in the status log 112. As another example, the data control device 104 may add or remove an association between an account and the user account 126 within the status log 112. As another example, the data control device 104 may modify the settings or permissions that are associated with the user account 126 within the status log 112. This process allows the current status of the user account 126 in the status log 112 to mirror the actual status of the user account 126.

At step 228, the data control device 104 adds an entry 502E in the event log 114 in response to sending the service instructions 128 to the provisioning service device 106. Returning to the example in FIG. 5, the data control device 104 creates an entry 502E that indicates the service instructions 128 from the service request 300 have been sent to the provisioning service device 106 for further processing. In this example, the data control device 104 populates the entry identifier field 506 with a unique identifier for the entry 502E. The data control device 104 populates the service request identifier field 508 with the unique identifier for the service request 300. The data control device 104 populates the status field 510 with a status that indicates that the service request 300 is "provisioning." The data control device 104 populates the processing information fields 512 with information about how the service request 300 was processed. The data control device 104 may populate the metadata fields 514 with any other information that is associated with the service request 300 and/or the processing of the service request 300.

Figure 12:
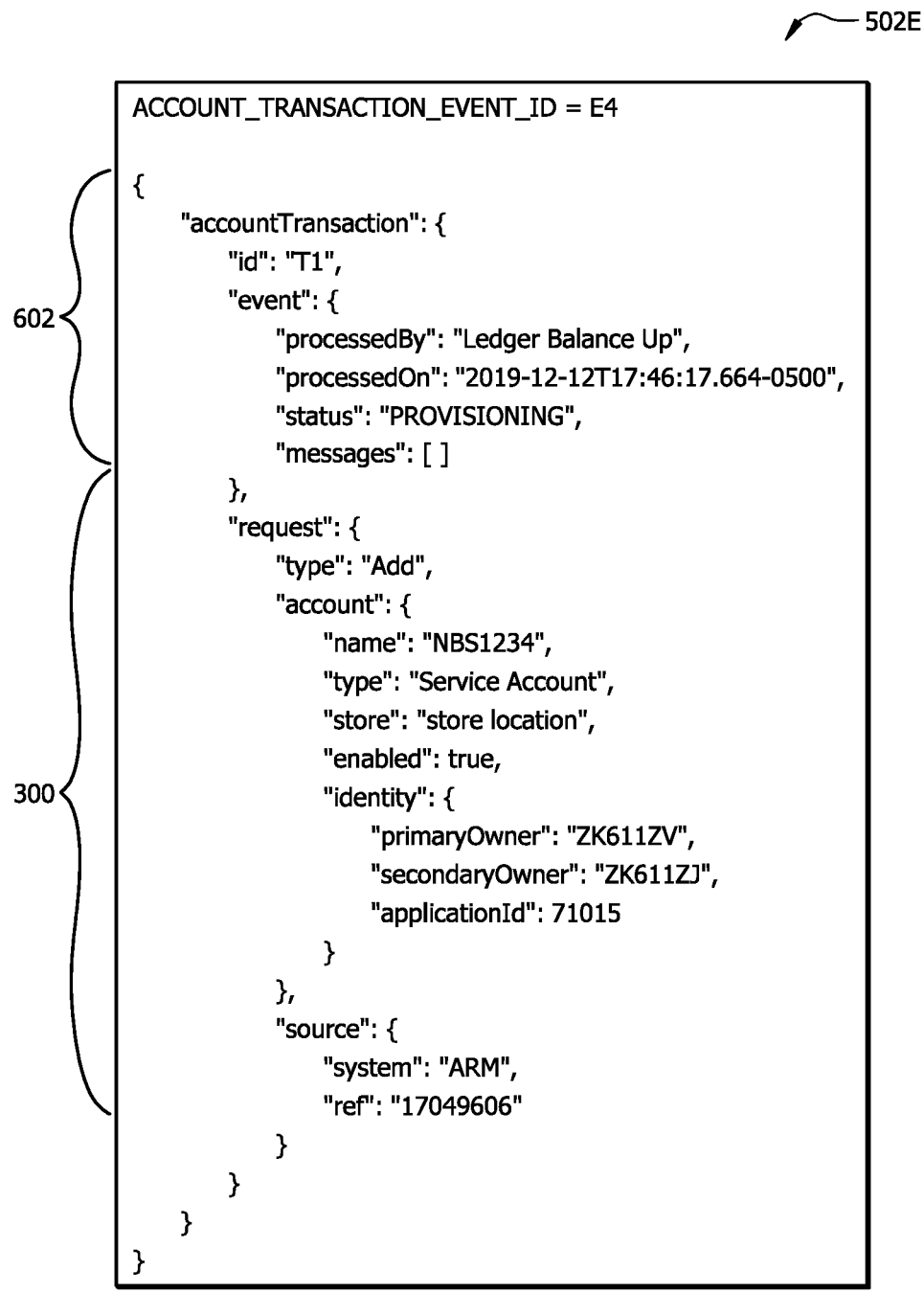
FIG. 12 is an example of an entry that is stored in an event log after a sending service instruction to a provisioning service device.

FIG. 12 shows another example of the entry 502E that may be stored in the event log 114. In this example, the data control device 104 modifies the status of the service request 300 within the processing information 602 to indicate that the status of the service request 300 is "provisioning." The portion of the entry 502E that included the copy of the service request 300 remains unchanged.

At step 230, the data control device 104 receives a confirmation message 130 from the provisioning service device 106 after the service is complete. The confirmation message 130 indicates that the provisioning service device 106 has completed updating the user account 126 based on the service instructions 128.

At step 232, the data control device 104 adds an entry 502F in the event log 114 in response to receiving the confirmation message 130. Here, the data control device 104 adds the entry 502F to the event log 114 to indicate that the servicing of the user account 126 is complete. Returning to the example in FIG. 5, the data control device 104 creates an entry 502F that indicates the service instructions 128 from the service request 300 have been sent to the provisioning service device 106 for further processing. In this example, the data control device 104 populates the entry identifier field 506 with a unique identifier for the entry 502F. The data control device 104 populates the service request identifier field 508 with the unique identifier for the service request 300. The data control device 104 populates the status field 510 with a status that indicates that the service request 300 is "confirmed." The data control device 104 populates the processing information fields 512 with information about how the service request 300 was processed. The data control device 104 may populate the metadata fields 514 with any other information that is associated with the service request 300 and/or the processing of the service request 300. In this example, the data control device 104 provides information that indicates that a new account was created and associated with the user account 126.

FIG. 13 shows another example of the entry 502F that may be stored in the event log 114. In this example, the data control device 104 modifies the status of the service request 300 within the processing information 602 to indicate that the status of the service request 300 is "confirmed." The portion of the entry 502F that included the copy of the service request 300 remains unchanged.

Using the data control ledger 108, the data control device 104 is able to provide end-to-end tracking from when a service request 300 is received until its requested modifications to the user account 126 has been completed. This process creates a record that can be used at a later time to resolve discrepancies with a user account 126 and/or to troubleshoot issues that are associated with the processing of a service request 300.

Data Control Reconciliation Process

Figure 14:
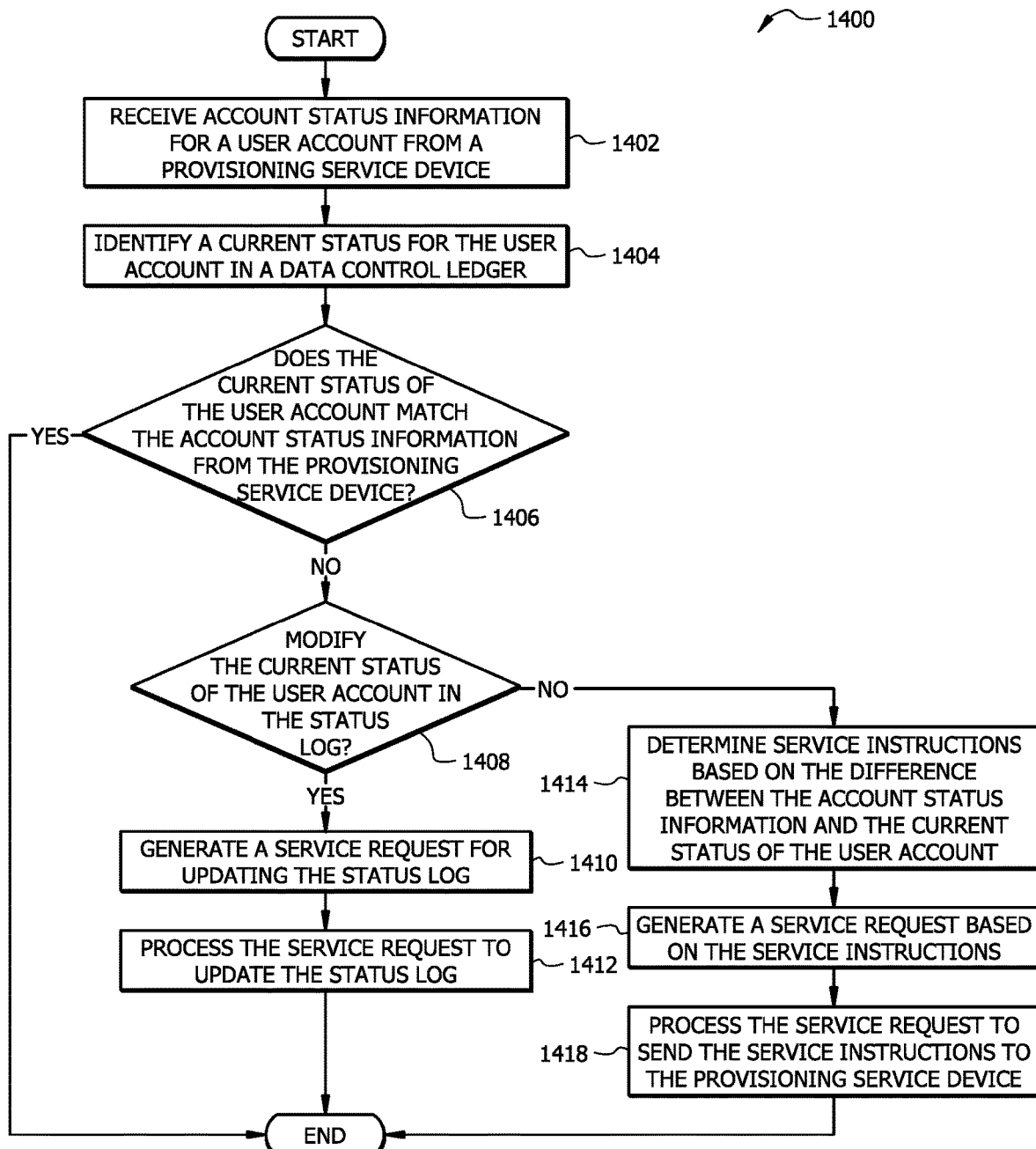
FIG. 14 is a flowchart of an embodiment of a reconciliation process for error correcting data control ledger information.

FIG. 14 is a flowchart of a reconciliation process 1400 for error-correcting data control ledger information. A reconciliation device 132 may employ process 1400 to identify differences between the user account information that is stored in a provisioning service device 106 and the information that is stored in a data control ledger 108. The data control device 104 may also use process 200 to generate a service request 300 for resolving any identified differences.

At step 1402, the reconciliation device 132 receives account status information 1502 for a user account 126 from a provisioning service device 106. In one embodiment, the data control device 104 may periodically request account status information 1502 from the provisioning service device 106. For example, the data control device 104 may send an account identifier for one or more user accounts 126 to a provisioning service device 106 to request account status information 1502 for the user accounts 126. This process allows the data control device 104 to periodically check whether the information stored in a data ledger 108 matches the information that is stored in the provisioning service device 106. The data control device 104 may request account status information 1502 for one or more user accounts 126 at any suitable time interval. The account status information 1502 identifies the current status of the user account 126 that is stored in the provisioning service device 106. For example, the account status information 1502 may comprise an account identifier, an account balance, account settings or permissions, a list of accounts that are associated with a user account 126, or any other suitable type of information that is associated with a user account 126.

At step 1404, the reconciliation device 132 identifies a current status for the user account 126 in a data control ledger 108. In embodiments where a data control ledger 108 is stored within the reconciliation device 132, the reconciliation device 132 may extract an account identifier for the user account 126 that is associated with the account status information 1502. The reconciliation device 132 may then use the account identifier as a search token to query the status log 112 for the current status for the user account 126 from the data control ledger 108. In embodiments where the data control ledger 108 is stored within a different device (e.g. a data control device 104), the reconciliation device 132 may send a request for the current status of a user account to a data control device 104. For example, the reconciliation device 132 may first extract an account identifier for the user account 126 that is associated with the account status information 1502. The reconciliation device 132 may then send the account identifier for one or more user accounts 126 to a data control device 104 to request a current status for the user accounts 126.

At step 1406, the reconciliation device 132 determines whether the current status of the user account 126 from the data control ledger 108 matches the account status information 1502 from the provisioning service device 106. Here, the reconciliation device 132 compares the current status of the user account 126 from the data control ledger 108 to the status of the user account 126 from the account status information 1502 from the provisioning service device 106. The reconciliation device 132 terminates process 1400 in response to determining that the current status of the user account 126 matches the account status information 1502 from the provisioning service device 106. In this case, the reconciliation device 132 determines that the information for the user account 126 from the provisioning service device 106 matches the information for the user account 126 from the data control ledger 108 which means that no further actions are necessary since the information matches.

The reconciliation device 132 proceeds to step 1408 in response to determining that the current status of the user account 126 does not match the account status information from the provisioning service device 106. In this case, the reconciliation device 132 determines that there is an error in the user account information in either the provisioning service device 106 or the data control ledger 108. In response to detecting an error, the data control device 104 will modify the information in either the provisioning service device 106 or the data control ledger 108 to correct the error so that the user account information matches in both the provisioning service device 106 and the data control ledger 108.

At step 1408, the reconciliation device 132 determines whether to modify the current status of the user account 126 in the status log 112. In one embodiment, the data control device 104 may be configured by default to select one of the provisioning service devices 106 or the status log 112 of the data control ledger 108 to correct in the event that an error has been detected. For example, the reconciliation device 132 may be configured by default to correct the user account information in the status log 112 of the data control ledger 108 in response to detecting an error.

In another embodiment, the reconciliation device 132 may prompt a user to select one of the provisioning service devices 106 or the data control ledger 108 to correct in the event that an error has been detected. For example, the reconciliation device 132 may send a message to a user that indicates that an error has been detected. The message may request a user input to select one of the provisioning service devices 106 or the data control ledger 108 to correct. Examples of messages include, but are not limited to, an email and an application notification. In this case, the reconciliation device 132 receives a user input that identifies one of the provisioning service devices 106 or the data control ledger 108 to correct from the user in response to querying the user.

The reconciliation device 132 proceeds to step 1410 in response to determining to modify the current status of the user account 126 in the status log 112 of the data control ledger 108. At step 1410, the data control device 104 generates a service request 300 for updating the status log 112. In this case, the service request 300 may comprise instructions that trigger the data control device 104 to modify the information in the status log 112 to match the current status of the user account 126 in the provisioning service device 106. For example, the reconciliation device 132 may determine a difference between the current status of the user account 126 from the data control ledger 108 and the current status of the user account 126 from the provisioning service device 106. The reconciliation device 132 may then generate instructions based on the determined differences to modify the current status of the user account 126 from the data control ledger 108 to match the current status of the user account 126 from the provisioning service device 106.

At step 1412, the reconciliation device 132 processes the service request 300 to update the status log 112 of the data control ledger 108. In the case where the data control ledger 108 is stored in reconciliation device 132, the reconciliation device 132 may use a process similar to the process described in FIG. 2 to process the service request 300 to update the status log 112 of the data control ledger 108. In the case where the data control ledger 108 is stored in a different device, the reconciliation device 132 may send the service request 300 to the data control device 104 for processing to update the status log 112 of the data control ledger 108.

Returning to step 1408, the reconciliation device 132 proceeds to step 1414 in response to determining not to modify the current status of the user account 126 in the status log 112. At step 1414, the reconciliation device 132 determines service instructions 128 based on the difference between the account status information 1502 and the current status of the user account 126 in the status log 112. The reconciliation device 132 may use a process similar to the process described in step 222 of FIG. 2 to determine service instructions 128.

At step 1416, the data control device 104 generates a service request 300 based on the service instructions 128. The data control device 104 may use a process similar to the process described in step 222 of FIG. 2 to generate the service request 300 based on the service instructions 128.

At step 1418, the reconciliation device 132 processes the service request 300 to send the service instructions 128 to the provisioning service device 106. In the case where the reconciliation device 132 is also configured as a data control device 104, the reconciliation device 132 may use a process similar to the process described in FIG. 2 to process the service request 300 to send the service instructions 128 to the provisioning service device 106.

In the case where the reconciliation is not configured as a data control device 104, the reconciliation device 132 may send the service request 300 to the data control device 104 for processing to send the service instructions 128 to the provisioning service device 106. In this case, the data control device 104 will not update its data control ledger 108 since the service request 300 does not modify its current status. In this case, the data control device 104 will instead forward the service instructions 128 on to the provisioning service device 106.

Integrated Data Control Ledgers

Figure 15:
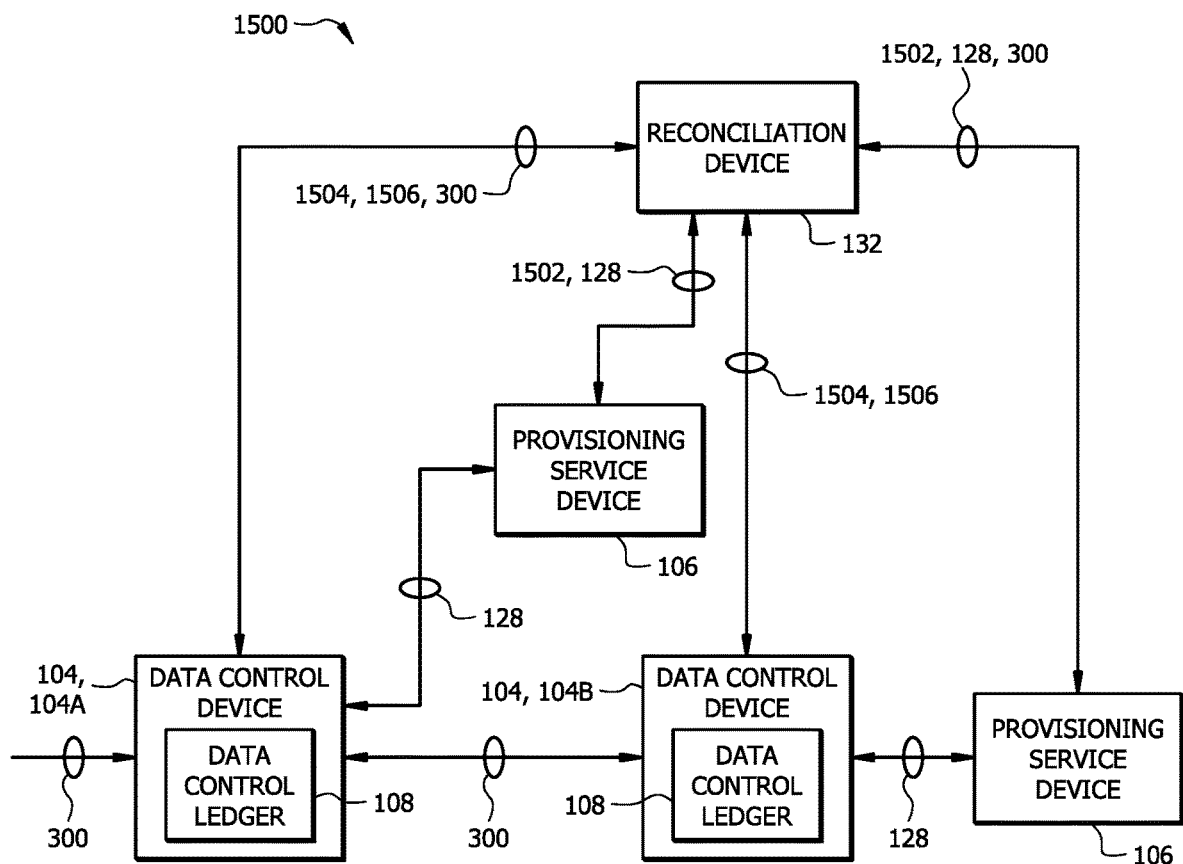
FIG. 15 is a schematic diagram of a data control system that is configured to use integrated data control ledgers.

FIG. 15 is a schematic diagram of a data control system 1500 that is configured to use integrated data control ledgers 108. In some embodiments, information that is associated with a user account 126 may be distributed among multiple data control ledgers 108. For example, a user account 126 may be associated with multiple groups within an enterprise. For instance, a user account 126 may be associated with business groups, information technology groups, human resource groups, legal groups, or any other suitable type of group within an enterprise. In this case, a data control ledger 108 may be associated with each of the different groups within an enterprise. Each data control ledger 108 may be stored within a different data control device 104 within the system 1500. The data control devices 104 are configured to share information from among their data control ledgers 108 to form an integrated data control ledger architecture for the system 1500.

The integrated data control ledger architecture is a network of data control ledgers 108 that allows changes in one data control ledger 108 to drive changes in other related data control ledgers 108. For example, updating information for a user account 126 in one data control ledger 108 may trigger changes to other data control ledgers 108 that are associated with the user account 126. For instance, a user's title may be changed within a first data control ledger 108 within a business group. The first data control ledger 108 may be linked with a second data control ledger 108 within an information technology group. After making changes to the first data control ledger 108, additional changes may be propagated to change information (e.g. account settings) in the second data control ledger 108 based on the changes made to the first data control ledger 108. In other examples, additional changes may be propagated to any number of data control ledgers 108.

The system 1500 may comprise a reconciliation device 132, one or more data control devices 104, and one or more provisioning service devices 106. The reconciliation device 132, the data control devices, and the provisioning service devices 106 may be configured similar to the reconciliation device 132, the data control devices 104, and the provisioning service devices 106 described in FIG. 1. The system 1500 may be configured similar to as shown in FIG. 15 or in any other suitable configuration. In FIG. 15, each data control device 104 is in signal communication with one or more other data control devices 104 and a provisioning service device 106. In other examples, each data control device 104 may be in signal communication with any suitable number of other data control devices 104 and/or provisioning service devices 106. In this configuration, the data control ledgers 108 from the data control devices 104 for an integrated data control ledger architecture. Each data control device 104 is configured to communicate with other data control devices 104 to manage the information within the integrated data control ledger architecture. An example of this process is described in FIG. 16.

The reconciliation device 132 is in signal communication with each of the data control devices 104 and the provisioning service devices 106. In this configuration, the reconciliation device 132 is configured to receive information about user accounts 126 from the data control devices 104 and the provisioning service devices 106 to ensure that all of the data matches. In the event that there is conflicting information about a user account 126, the reconciliation device 132 is configured to perform error correction to correct any conflicting information. An example of the reconciliation device 132 performing this operation is described in FIG. 17.

Data Control Process Using Integrated Data Control Ledgers

Figure 16:
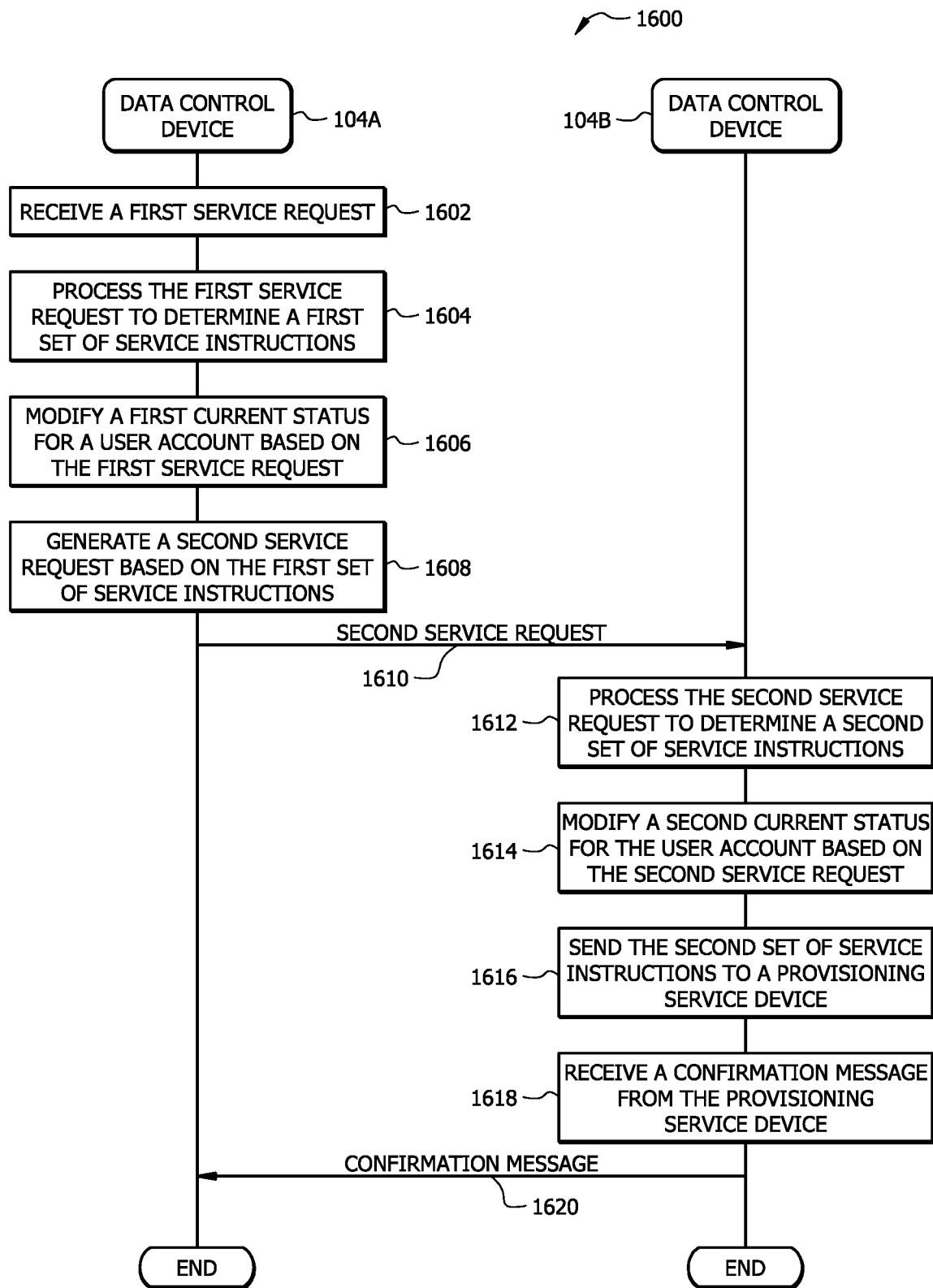
FIG. 16 is a protocol diagram of an embodiment of a data control process for using integrated data control ledgers.

FIG. 16 is a protocol diagram of an embodiment of a data control process 1600 for using integrated data control ledgers 108. A data control device 104 may employ process 1600 to make changes to a user account 126 that is managed using an integrated data control ledger architecture. This process uses a first data control ledger 108 to track certain aspects of a user account 126 that are associated with a particular group within an enterprise and one or more other data control ledgers 108 to track other aspects of the user account 126 that are associated with other groups within the enterprise.

This process allows a network device 102 to modify multiple aspects of a user account 126 without having to send requests to each of the provisioning service devices 106 that are associated with user account 126. This means that the network device 102 does not need to be aware of all the provisioning service devices 106 that are associated with a user account 126. This configuration provides an extra layer of information security since network devices 102 are not interacting directly with provisioning service devices 106. This configuration also provides additional information security since a network device 102 does not have complete knowledge about the provisioning service devices 106 that are associated with a user account 126. This means that in the event that a network device 102 becomes compromised by a bad actor, the bad actor will be unable to directly modify the user account information that is stored in a provisioning service device 106.

At step 1602, the first data control device 104A receives a first service request 300. For example, a network device 102 may send the first service request 300 to the first data control device 104A with instructions for modifying a user account 126. The header portion 302 of the service request 300 may identify the network device 102 as the source of the service request 300. The body portion 304 of the service request 300 may identify a particular user account 126 and provide instructions for modifying the user account 126. The first service request 300 may be similar to the service request 300 described in step 202 of FIG. 2. For example, the service request 300 may comprise instructions for adding a new account to the user account 126, removing an existing account from the user account 126, increasing a balance of a user account 126, decreasing a balance of a user account 126, changing settings or permissions for a user account 126, changing account information that is associated with a user account 126 (e.g. changing a user role or title), or any other suitable type of instructions for modifying a user account 126.

At step 1604, the first data control device 104A processes the first service request 300 to determine a first set of service instructions 128. The first data control device 104A may process the first service request 300 using a process similar to the process described in steps 204-222 in FIG. 2. For example, the first data control device 104A may add an entry 402 in the service request log 110 and an entry 502 in the event log 114 in response to receiving the first service request 300. The first data control device 104A then validates the first service request 300 and adds an entry 502 in the event log 114 in response to the first service request 300 passing validation. The first data control device 104A may then identify a first current status of the user account 126 and determine that the first service request 300 modifies the first current status of the user account 126. The first data control device 104A may then determine a first set of service instructions 128 based on the determined modifications to the first current status of the user account 126.

At step 1606, the first data control device 104A modifies a first current status for the user account 126 based on the first service request 300. The first data control device 104A modifies the first current status for the user account 126 and updates the status log 112 using a process similar to the process described in step 226 in FIG. 2.

At step 1608, the first data control device 104A generates a second service request 300B based on the first set of service instructions 128. The second service request 300 may be similar to the first service request 300 described in step 1602. For example, the second service request 300 may comprise a header portion 302 and a body portion 304. The header portion 302 of the second service request 300 may identify the first data control device 104A as the source of the second service request 300. The body portion 304 of the second service request 300 may identify a particular user account 126 and provide the first set of service instructions 128 for modifying the user account 126.

At step 1610, the first data control device 104A sends the second service request 300B to the second data control device 104B. The first data control device 104A identifies the second data control device 104B that comprises a data ledger 108 that is associated with the user account 126. The first data control device 104A may send the second service request 300B using any suitable communication protocol.

In some embodiments, the first data control device 104A may also send the first set of service instructions 128 to a provisioning service device 106 for processing as well. In this case, the first data control device 104A may send the first set of service instructions 128 to the provisioning service device 106 to make some changes to the user account 126 while it sends the service request 300 to other data control devices 104 for additional modifications to the user account 126. For example, the first data control device 104A may send the first set of service instructions 128 to a provisioning service device 106 to modify a role or title for a user within a business group. This may be performed in parallel while the first data control device 104A sends the second service request 300 to the second data control device 104B to modify the user account 126 within an information technology group.

At step 1612, the second data control device 104B processes the second service request 300B to determine a second set of service instructions 128. The second data control device 104B may process the second service request 300 using a process similar to the process described in steps 204-222 of FIG. 2. For example, the second data control device 104B may add an entry 402 in the service request log 110 and an entry 502 in the event log 114 in response to receiving the second service request 300. The second data control device 104B then validates the second service request 300 and adds an entry 502 in the event log 114 in response to the second service request 300 passing validation. The second data control device 104B may then identify a second current status of the user account 126 and determine that the second service request 300 modifies the second current status of the user account 126. The second data control device 104B may then determine a second set of service instructions 128 based on the determined modifications to the second current status of the user account 126.

In one embodiment, the second data control device 104B may be configured to use a mapping or a look-up table to determine how the service instructions 128 affect changes to the second data control device 104B. For example, continuing with the previous example, the first data control device 104A may send service instructions 128 to the second data control device 104B based on changes that were made to a user's role or title. In this example, the second data control device 104B may use a look-up table to determine the settings or permissions that are associated with the new role or title for the user. After identifying the appropriate settings or permissions, the second data control device 104B may compare the identified settings to the current settings in the user account 126 to determine whether to modify the user account 126. If the identified settings are different from the current settings or permissions in the user account 126, then the second data control device 104B may identify the differences and generate the second set of service instructions 128 based on the identified differences. In other examples, the second data control device 104B may be configured to use a mapping between any other suitable type of attributes for a user account 126.

At step 1614, the second data control device 104B modifies a second current status for the user account 126 based on the second service request 300. The second data control device 104B modifies the second current status for the user account 126 and updates the status log 112 using a process similar to the process described in step 226 in FIG. 2.

At step 1616, the second data control device 104B sends the second set of service instructions 128 to a provisioning service device 106. The second data control device 104 may send the second set of service instructions 128 to the provisioning service device 106 using a process similar to the process described in step 224. The second data control device 104B sends the second set of service instructions to the provisioning service device 106 to make additional modifications to the user account 126. Continuing with the previous example, the second data control device 104B may be associated with an information technology group within the enterprise. In this case, the second data control device 104B sends the second set of service instructions to the provisioning service device 106 to update the user's account setting or permission based on the user's role or title change. This process allows different aspects of a user account 126 to be compartmentalized so they can be individually adjusted by their respective groups within the enterprise. This is in contrast to existing systems where a single group is responsible for making all of the changes to a user account 126. This process allows for individual changes to be made without affecting other groups which improves the efficiency of the system 1500.

At step 1618, the second data control device 104B receives a confirmation message 130 from the provisioning service device 106. The second data control device 104B adds an entry 502 to the event log 114 in response to receiving the confirmation message 130 from the provisioning service device 106. The second data control device 104B adds the entry 502 to its event log 114 to indicate that the servicing of the user account 126 is complete.

At step 1620, the second data control device 104B sends the confirmation message 130 to the first data control device 104A. The first data control device 104A adds an entry 502 to the event log 114 in response to receiving the confirmation message 130 from the second data control device 104B. The first data control device 104A adds the entry 502 to its event log 114 to indicate that the servicing of the user account 126 is complete.

Using the integrated data control ledger architecture, the data control devices 104 are able to provide end-to-end tracking from when the first service request 300 is received until its requested service has been completed by both the first data control device 104A and the second data control device 104B. This process creates a record that can be used at a later time to resolve discrepancies with a user account 126 and/or to troubleshoot issues that are associated with the processing of a service request 300. For example, the data control ledgers 108 can be used to identify which data control devices 104 and groups contain information that conflicts with the information in a provisioning service device 106.

Data Control Reconciliation Process for Multiple Data Control Ledgers

Figure 17:
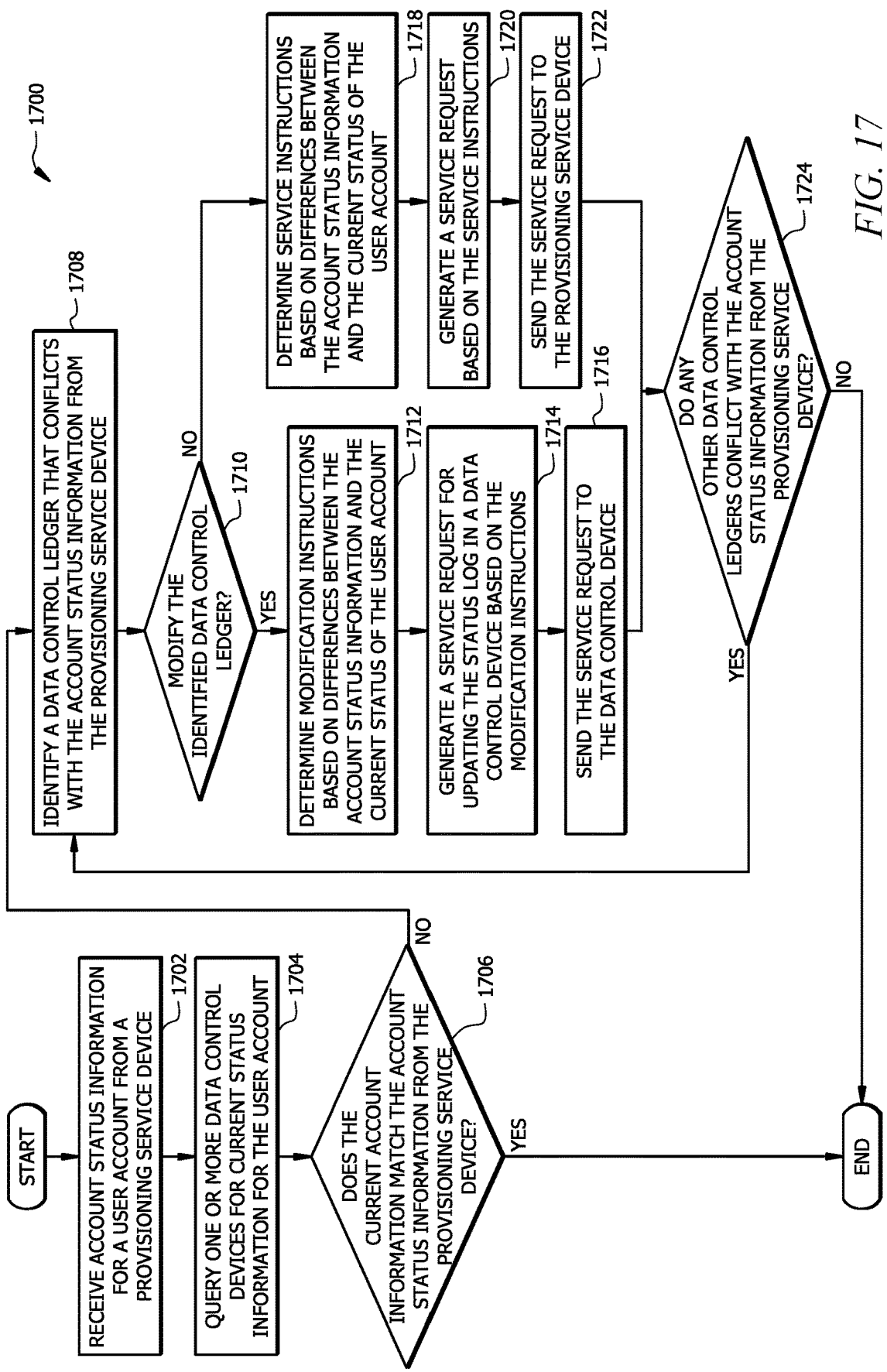
FIG. 17 is a flowchart of an embodiment of a reconciliation process for multiple data control ledgers.

FIG. 17 is a flowchart of an embodiment of a reconciliation process 1700 for multiple data control ledgers 108. A reconciliation device 132 may employ process 1700 to identify differences between the user account information that is stored in provisioning service devices 106 and the information that is stored in a plurality of data control ledgers 108 that are configured as an integrated data control ledger. The reconciliation device 132 also uses process 1700 to generate a service request 300 for resolving any identified differences within the integrated data control ledger.

At step 1702, the reconciliation device 132 receives account status information 1502 for a user account 126 from one or more provisioning service devices 106. In one embodiment, the reconciliation device 132 may periodically request account status information 1502 from provisioning service devices 106. For example, the reconciliation device 132 may send an account identifier for one or more user accounts 126 to one or more provisioning service devices 106 to request account status information 1502 for the user account 126. This process allows the reconciliation device 132 to periodically check whether the information stored in its data ledger 108 matches the information that is stored in the provisioning service devices 106. The reconciliation device 132 may request account status information 1502 for one or more user accounts 126 at any suitable time interval. The account status information 1502 identifies the current status of the user account 126 that is stored in the provisioning service devices 106. The account status information 1502 may comprise an account identifier, an account balance, account settings or permissions, a list of accounts that are associated with a user account 126, or any other suitable type of information that is associated with a user account 126.

At step 1704, the reconciliation device 132 queries one or more data control devices 104 for current status information 1504 for the user account 126. The reconciliation device 132 may send a request to one or more data control devices 104 to query the data control devices 104 for the current status information 1504 for the user account 126. For example, the reconciliation device 132 may send an account identifier for one or more user accounts 126 to the data control devices 104 to request current status information 1504 for the user account 126. The current status information 1504 identifies the current status of the user account 126 that is stored in the data ledger 108 of each data control device 104. The current status information 1504 may comprise an account identifier, an account balance, account settings or permissions, a list of accounts that are associated with a user account 126, or any other suitable type of information that is associated with a user account 126.

At step 1706, the reconciliation device 132 determines whether the current status information 1504 from the data control devices 104 matches the account status information 1502 from the provisioning service devices 106. Here, the reconciliation device 132 compares the current status of the user account 126 from the data control ledger 108 of a data control device 104 to the current status of the user account 126 from the account status information 1502 from a provisioning service device 106. The reconciliation device 132 terminates process 1700 in response to determining that the current status of the user account 126 from the data control devices 104 matches the account status information 1502 from the provisioning service devices 106. In this case, the reconciliation device 132 determines that the information for the user account 126 from the provisioning service device 106 matches the information for the user account 126 from the data control ledgers 108 of the data control devices 104 which means that no further actions are necessary since the information matches.

The reconciliation device 132 proceeds to step 1708 in response to determining that the current status of the user account 126 from one of the data control devices 104 does not match the account status information 1502 from one of the provisioning service devices 106. In this case, the reconciliation device 132 determines that there is an error in the user account information in either one of the provisioning service devices 106 or the data control ledger 108 from one of the data control devices 104. In response to detecting an error, the reconciliation device 132 will modify the user account information in either one of the provisioning service devices 106 or the data control ledger 108 from one of the data control devices 104 to correct the error so that the user account information matches in both the provisioning service device 106 and the data control device 104.

At step 1708, the reconciliation device 132 identifies a data control ledger 108 that conflicts with the account status information 1502 from one of the provisioning service devices 106. Here, the reconciliation device 132 iteratively identifies the data control device 104 that has a data control ledger 108 that conflicts with the information in one of the provisioning service devices 106. For example, the reconciliation device 132 may generate a list of data control devices 104 that contains a data control ledger 108 with information that conflicts with a provisioning service device 106. The reconciliation device 132 may then sequentially select each data control device 104 to determine how to reconcile any conflicting information.

At step 1710, the reconciliation device 132 determines whether to modify the identified data control device 104. The reconciliation device 132 may determine whether to modify the identified data control device 104 using a process similar to the process described in step 1408 of FIG. 14. For example, the reconciliation device 132 may be configured by default to select one of the provisioning service devices 106 or the data control ledger 108 of the data control device 104 to correct in the event that an error has been detected. For example, the reconciliation device 132 may be configured by default to correct the user account information in the status log 112 of the data control ledger 108 in response to detecting an error.

As another example, the reconciliation device 132 may prompt a user to identify one of the provisioning service devices 106 or the data control device 104 to correct in the event that an error has been detected. For example, the reconciliation device 132 may send a message to a user that indicates that an error has been detected and requests a user input to select one of the provisioning service devices 106 or the data control device 104 to correct. Examples of messages include, but are not limited to, an email and an application notification. The reconciliation device 132 receives a user input that identifies one of the provisioning service devices 106 or the data control device 104 to correct from the user in response to prompting the user.

As another example, the reconciliation device 132 may be configured to correct the data control device 104 in response to determining that the current status of the user account 126 in the data control ledger 108 of the identified data control device 104 conflicts with the account status information 1502 from more than one provisioning service device 106. For instance, the data control device 104 may first determine that the account status information 1502 from multiple provisioning service devices 106 is the same. In this case, the reconciliation device 132 can determine that since multiple provisioning service devices 106 are reporting the same current status for the user account 126 then the error may exist in the data control ledger 108 of the identified data control device 104. In this case, the reconciliation device 132 will select the identified data control device 104 to correct the information in its data control ledger 108.

The reconciliation device 132 proceeds to step 1712 in response to determining to modify the identified data control device 104. At step 1712, the reconciliation device 132 determines modification instructions 1506 based on the differences between the account status information 1502 and the current status of the user account 126. The reconciliation device 132 may use a process similar to the process described in step 222 in FIG. 2 to determine modification instructions 1506.

At step 1714, the reconciliation device 132 generates a service request 300 for updating the status log 112 in a data control device 104. Here, the reconciliation device 132 includes the modification instructions 1506 within a service request 300. For example, the service request 300 may comprise a header portion 302 that includes source name or identifier that identifies the reconciliation device 132 and a body portion 304 that includes the modification instructions 1506 for modifying the data control ledger 108 in the data control device 104.

At step 1716, the reconciliation device 132 sends the service request 300 to the data control device 104. The reconciliation device 132 may use any suitable messaging protocol to send the service request 300 to the data control device 104.

Returning to step 1710, the reconciliation device 132 proceeds to step 1718 in response to determining not to modify the data control ledger 108 of the data control device 104. In this case, the reconciliation device 132 determines to modify the account status information 1502 in the provisioning service device 106 instead of modifying the data control ledger 108 in the data control device 104. At step 1718, the reconciliation device 132 determines service instructions 128 based on differences between the account status information 1502 and the current status of the user account 126. The reconciliation device 132 may use a process similar to the process described in step 222 in FIG. 2 to determine service instructions 128.

At step 1720, the reconciliation device 132 generates a service request 300 based on the service instructions 128. Here, the reconciliation device 132 provides the service instructions 128 within a service request 300. For example, the service request 300 may comprise a header portion 302 that includes source name or identifier that identifies the reconciliation device 132 and a body portion 304 that includes the service instructions 128 for modifying the user account 126 in the provisioning service device 106.

At step 1722, the reconciliation device 132 sends the service request 300 to the provisioning service device 106. The data control device 104 may use any suitable messaging protocol to send the service request 300 to the provisioning service device 106.

At step 1724, the reconciliation device 132 determines whether any other data control ledgers 108 from other data control devices 104 conflicts with the account status information 1502 from the provisioning service device 106. The reconciliation device 132 returns to step 1708 in response to determining that a data control ledger 108 from another data control device 104 conflicts with the account status information 1502 from the provisioning service device 106. In this case, the reconciliation device 132 returns to step 1708 correct differences between another data control device 104 and a provisioning service device 106. The reconciliation device 132 terminates process 1700 in response to determining that there are no more data control ledgers 108 that conflict with the account status information 1502 from the provisioning service device 106.

Hardware Configuration for a Device

Figure 18:
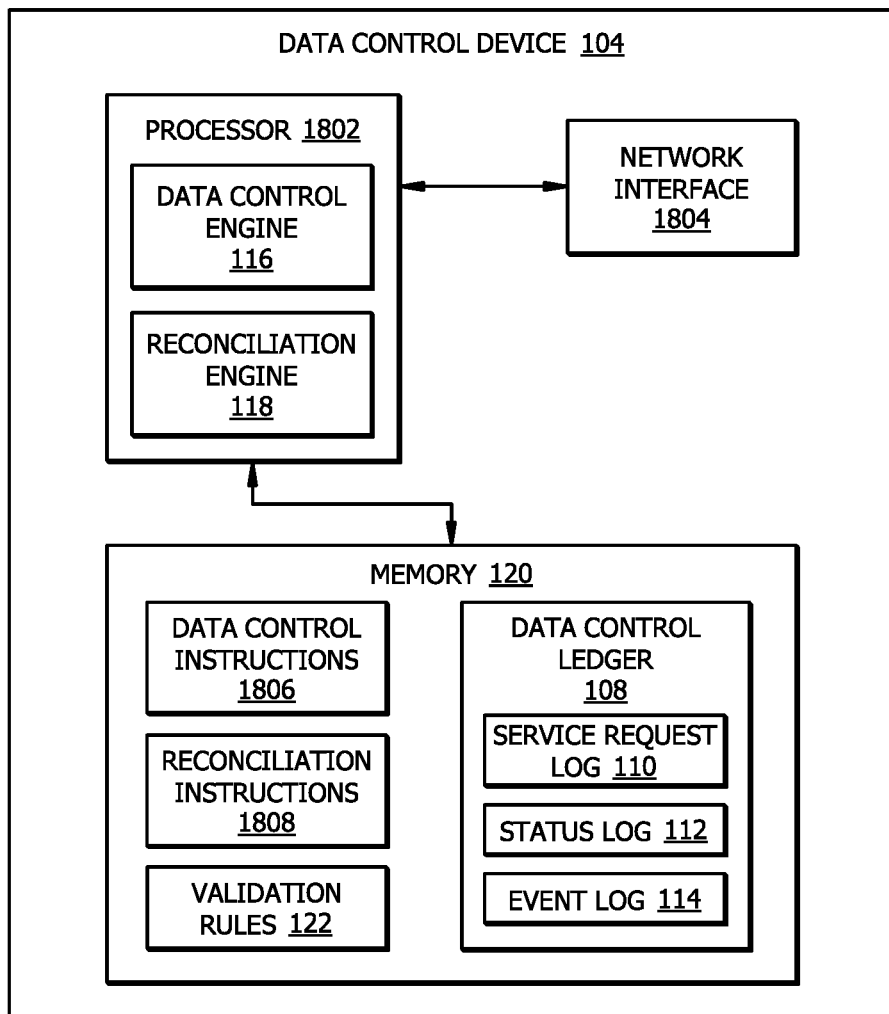
FIG. 18 is an embodiment of a device configured to use data control ledgers.

FIG. 18 is a schematic diagram of an embodiment of a device configured to operate as a data control device 104. In other embodiments, the device may be used to implement various components of the system 100 and 1500, such as, for example, the network device 102 or the reconciliation device 132 of FIG. 1. As an example, the data control device 104 comprises a processor 1802, a memory 120, and a network interface 1804. The data control device 104 may be configured as shown or in any other suitable configuration.

The processor 1802 comprises one or more processors operably coupled to the memory 120. The processor 1802 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 1802 may be a programmable logic device, a microcontroller, a microprocessor, or any suitable combination of the preceding. The processor 1802 is communicatively coupled to and in signal communication with the memory 120. The one or more processors are configured to process data and may be implemented in hardware or software. For example, the processor 1802 may be 8-bit, 16-bit, 32-bit, 64-bit, or of any other suitable architecture. The processor 1802 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute data control instructions 1806 and reconciliation instructions 1808 to implement a data control engine 116 and a reconciliation engine 118, respectively. In this way, processor 1802 may be a special-purpose computer designed to implement the functions disclosed herein. In an embodiment, the data control engine 116 and the reconciliation engine 118 are implemented using logic units, FPGAs, ASICs, DSPs, or any other suitable hardware. The data control engine 116 is configured to operate as described in FIGS. 2 and 16. For example, the data control engine 116 may be configured to perform the steps of process 200 and 1600 as described in FIGS. 2 and 16, respectively. The reconciliation engine 118 is configured to operate as described in FIGS. 14 and 17. For example, the reconciliation engine 118 may be configured to perform the steps of process 1400 and 1700 as described in FIGS. 14 and 17, respectively.

The memory 120 is operable to store any of the information described above with respect to FIGS. 1-17 along with any other data, instructions, logic, rules, or code operable to implement the function(s) described herein when executed by the processor 1802. The memory 120 comprises one or more disks, tape drives, or solid-state drives, and may be used as an over-flow data storage device, to store programs when such programs are selected for execution, and to store instructions and data that are read during program execution. The memory 120 may be volatile or non-volatile and may comprise a read-only memory (ROM), random-access memory (RAM), ternary content-addressable memory (TCAM), dynamic random-access memory (DRAM), and static random-access memory (SRAM).

The memory 120 is operable to store data control instructions 1806, reconciliation instructions 1808, validation rules 122, data control ledgers 108, and/or any other data or instructions. The data control instructions 1806 and the reconciliation instructions 1808 may comprise any suitable set of instructions, logic, rules, or code operable to execute the data control engine 116 and the reconciliation engine 118, respectively. The validation rules 122 and data control ledgers 108 are configured similar to the validation rules 122 and the data control ledgers 108 described in FIGS. 1-17.

The network interface 1804 is configured to enable wired and/or wireless communications. The network interface 1804 is configured to communicate data between the data control device 104 and other devices (e.g. network devices 102 and provisioning service devices 106), systems, or domains. For example, the network interface 1804 may comprise a near-field communication (NFC) interface, a Bluetooth interface, Zigbee interface, a Z-wave interface, a Radio-Frequency Identification (RFID) interface, a WIFI interface, a LAN interface, a WAN interface, a modem, a switch, or a router. The processor 1802 is configured to send and receive data using the network interface 1804. The network interface 1804 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A data control device, comprising:
 a network interface configured to communicate with a provisioning service device, wherein:
  the provisioning service device is configured to modify a user account; and the provisioning service device is associated with a group within an enterprise;
a memory operable to store:
a status log configured to store current status information for user accounts, wherein the current status information comprises a plurality of account identifiers that are each linked to a current status for the user account; and
a processor operably coupled to the network interface and the memory, configured to:
receive account status information of the user account from the provisioning service device, wherein the account status information is different from the current status information, and comprises:
an account identifier for the user account; and
a first current status for the user account;
query the status log using the account identifier to determine a second current status of the user account;
compare the first current status for the user account from the provisioning service device to the second current status of the user account in the status log;
determine the first current status for the user account from the provisioning service device does not match the second current status of the user account in the status log based on the comparison to detect conflicting information of the user account between the current status information in the status log and the account status information in the provisioning service device;
determine whether to update the second current status of the status log based on the detected conflicting information and update the second current status of the status log by using modification instructions to correct the conflicting information of the user account in the status log, wherein correcting the conflicting information of the user account in the status log results in the current status information of the status log matching the account status information of the user account in the provisioning service device; and
determine whether to update the first current status of the provisioning service device based on the detected conflicting information and update the first current status of the provisioning service device by using service instructions to correct the conflicting information of the user account in the provisioning service device, wherein correcting the conflicting information of the user account in the provisioning service device results in the current status information of the user account in the status log matching the account status information of the user account in the provisioning service device.

2. The device of claim 1, wherein updating the second current status of the status log comprises:
identifying a difference between the first current status for the user account from the provisioning service device and the second current status of the user account in the status log;
determining the modification instructions for modifying the second current status of the user account in the status log based on the identified difference;
generating a service request that comprises the modification instructions; and
processing the service request to update the second current status of the status log.

3. The device of claim 2, wherein:
the memory is further operable to store:
a service request log configured to store information associated with received service requests for modifying user accounts;
an event log configured to store processing status information for service requests; and
processing the service request comprises:
adding an entry in the service request log in response to receiving the service request, wherein the entry in the service request log comprises information from the service request;
adding an entry in the event log in response to receiving the service request, wherein the entry in the event log indicates that the service request that was received; and
adding an entry in the event log after processing the service request.

4. The device of claim 1, wherein updating the first current status of the provisioning service device comprises:
identifying a difference between the first current status for the user account from the provisioning service device and the second current status of the user account in the status log;
determining the service instructions that identify actions for the provisioning service device to perform on the user account;
generating a service request that comprises the service instructions; and
processing the service request to send the service instructions to the provisioning service device.

5. The device of claim 4, wherein:
the memory is further operable to store:
a service request log configured to store information associated with received service requests for modifying user accounts;
an event log configured to store processing status information for service requests; and
processing the service request comprises:
adding an entry in the service request log in response to receiving the service request, wherein the entry in the service request log comprises information from the service request;
adding an entry in the event log in response to receiving the service request, wherein the entry in the event log indicates that the service request that was received; and
adding an entry in the event log after processing the service request.

6. The device of claim 1, wherein determining the first current status for the user account from the provisioning service device does not match the second current status of the user account in the status log comprises:
identifying a first set of account settings based on the first current status for the user account from the provisioning service device;
identifying a second set of account settings based on the second current status of the user account in the status log; and
determining that the first set of account settings are different from the second set of account settings.

7. The device of claim 1, wherein determining the first current status for the user account from the provisioning service device does not match the second current status of the user account in the status log comprises:
identifying a first account balance based on the first current status for the user account from the provisioning service device;
identifying a second account balance based on the second current status of the user account in the status log; and
determining that the first account balance is different from the second account balance.

8. The device of claim 1, wherein determining the first current status for the user account from the provisioning service device does not match the second current status of the user account in the status log comprises:
   identifying a first set of accounts based on the first current status for the user account from the provisioning service device;
   identifying a second set of accounts based on the second current status of the user account in the status log; and
   determining that the first set of accounts is different from the second set of accounts.

9. A data control method, comprising:
   receiving account status information of a user account from a provisioning service device, wherein:
      the provisioning service device is configured to modify the user account;
      the provisioning service device is associated with a group within an enterprise; and
      the account status information comprises:
         an account identifier for the user account; and
         a first current status for the user account;
   querying a status log using the account identifier to determine a second current status of the user account, wherein the status log is configured to store current status information for user accounts, wherein the current status information is different from the account status information, and comprises a plurality of account identifiers that are each linked to a current status for the user account;
   comparing the first current status for the user account from the provisioning service device to the second current status of the user account in the status log;
   determining the first current status for the user account from the provisioning service device does not match the second current status of the user account in the status log based on the comparison to detect conflicting information of the user account between the current status information in the status log and the account status information in the provisioning service device;
   determining whether to update the second current status of the status log based on the detected conflicting information and updating the second current status of the status log by using modification instructions to correct the conflicting information of the user account in the status log, wherein correcting the conflicting information of the user account in the status log results in the current status information of the status log matching the account status information of the user account in the provisioning service device; and
   determining whether to update the first current status of the provisioning service device based on the detected conflicting information and updating the first current status of the provisioning service device by using service instructions to correct the conflicting information of the user account in the provisioning service device, wherein correcting the conflicting information of the user account in the provisioning service device results in the current status information of the user account in the status log matching the account status information of the user account in the provisioning service device.

10. The method of claim 9, wherein updating the second current status of the status log comprises:
   identifying a difference between the first current status for the user account from the provisioning service device and the second current status of the user account in the status log;
   determining the modification instructions for modifying the second current status of the user account in the status log based on the identified difference;
   generating a service request that comprises the modification instructions; and
   processing the service request to update the second current status of the status log.

11. The method of claim 10, further comprising:
   adding an entry in a service request log in response to receiving the service request, wherein:
      the service request log configured to store information associated with received service requests for modifying user accounts; and
      the entry in the service request log comprises information from the service request;
   adding an entry in an event log in response to receiving the service request, wherein:
      the event log configured to store processing status information for service requests; and
      the entry in the event log indicates that the service request that was received; and
   adding an entry in the event log after processing the service request.

12. The method of claim 9, wherein updating the first current status of the provisioning service device comprises:
   identifying a difference between the first current status for the user account from the provisioning service device and the second current status of the user account in the status log;
   determining the service instructions that identify actions for the provisioning service device to perform on the user account;
   generating a service request that comprises the service instructions; and
   processing the service request to send the service instructions to the provisioning service device.

13. The method of claim 12, further comprising:
   adding an entry in a service request log in response to receiving the service request, wherein:
      the service request log configured to store information associated with received service requests for modifying user accounts; and
      the entry in the service request log comprises information from the service request;
   adding an entry in an event log in response to receiving the service request, wherein:
      the event log configured to store processing status information for service requests;
      the entry in the event log indicates that the service request that was received; and
   adding an entry in the event log after processing the service request.

14. The method of claim 9, wherein determining the first current status for the user account from the provisioning service device does not match the second current status of the user account in the status log comprises:
   identifying a first set of account settings based on the first current status for the user account from the provisioning service device;
   identifying a second set of account settings based on the second current status of the user account in the status log; and
   determining that the first set of account settings are different from the second set of account settings.

15. The method of claim 9, wherein determining the first current status for the user account from the provisioning service device does not match the second current status of the user account in the status log comprises:

identifying a first account balance based on the first current status for the user account from the provisioning service device;

identifying a second account balance based on the second current status of the user account in the status log; and determining that the first account balance is different from the second account balance.

16. The method of claim 9, wherein determining the first current status for the user account from the provisioning service device does not match the second current status of the user account in the status log comprises:

identifying a first set of accounts based on the first current status for the user account from the provisioning service device;

identifying a second set of accounts based on the second current status of the user account in the status log; and determining that the first set of accounts is different from the second set of accounts.

17. A non-transitory computer-readable storage medium storing instructions that, when executed by a processor, causes the processor to:

receive account status information of a user account from a provisioning service device, wherein:

the provisioning service device is configured to modify the user account;

the provisioning service device is associated with a group within an enterprise; and the account status information comprises:

an account identifier for the user account; and a first current status for the user account;

query a status log using the account identifier to determine a second current status of the user account, wherein the status log is configured to store current status information for user accounts, wherein the current status information is different from the account status information, and comprises a plurality of account identifiers that are each linked to a current status for the user account;

compare the first current status for the user account from the provisioning service device to the second current status of the user account in the status log;

determine the first current status for the user account from the provisioning service device does not match the second current status of the user account in the status log based on the comparison to detect conflicting information of the user account between the current status information in the status log and the account status information in the provisioning service device;

determine whether to update the second current status of the status log based on the detected conflicting information and update the second current status of the status log by using modification instructions to correct the conflicting information of the user account in the status log, wherein correcting the conflicting information of the user account in the status log results in the current status information of the status log matching the account status information of the user account in the provisioning service device; and determine whether to update the first current status of the provisioning service device based on the detected conflicting information and update the first current status of the provisioning service device by using service instructions to correct the conflicting information of the user account in the provisioning service device, wherein correcting the conflicting information of the user account in the provisioning service device results in the current status information of the user account in the status log matching the account status information of the user account in the provisioning service device.

18. The non-transitory computer-readable storage medium of claim 17, wherein updating second current status of the status log comprises:

identifying a difference between the first current status for the user account from the provisioning service device and the second current status of the user account in the status log;

determining the modification instructions for modifying the second current status of the user account in the status log based on the identified difference;

generating a service request that comprises the modification instructions; and processing the service request to update the second current status of the status log.

19. The non-transitory computer-readable storage medium of claim 17, wherein updating the first current status of the provisioning service device comprises:

identifying a difference between the first current status for the user account from the provisioning service device and the second current status of the user account in the status log;

determining the service instructions that identify actions for the provisioning service device to perform on the user account;

generating a service request that comprises the service instructions; and processing the service request to send the service instructions to the provisioning service device.

20. The non-transitory computer-readable storage medium of claim 17, wherein determining the first current status for the user account from the provisioning service device does not match the second current status of the user account in the status log comprises:

identifying a first set of account settings based on the first current status for the user account from the provisioning service device;

identifying a second set of account settings based on the second current status of the user account in the status log; and determining that the first set of account settings are different from the second set of account settings.

* * * * *